United States Patent
Mitlin

(10) Patent No.: US 7,263,130 B1
(45) Date of Patent: Aug. 28, 2007

(54) METHOD AND APPARATUS FOR EVALUATING ERROR CONTROL PARAMETERS OF SELF-SIMILAR CONSTELLATIONS

(75) Inventor: Vlad Mitlin, San Diego, CA (US)

(73) Assignee: 3Com Corporation, Marlborough, MA (US)

(*) Notice: Subject to any disclaimer, the term of this patent is extended or adjusted under 35 U.S.C. 154(b) by 1127 days.

(21) Appl. No.: 09/865,763

(22) Filed: May 25, 2001

(51) Int. Cl.
*H04K 1/10* (2006.01)
*H04L 27/28* (2006.01)

(52) U.S. Cl. ............... 375/260; 375/365; 375/468; 375/208

(58) Field of Classification Search ............ 375/260, 375/261, 353, 365; 370/468, 208
See application file for complete search history.

(56) References Cited

U.S. PATENT DOCUMENTS

| | | | |
|---|---|---|---|
| 4,855,692 A * | 8/1989 | Kennard et al. ............ 332/103 |
| 4,882,733 A * | 11/1989 | Tanner ...................... 714/752 |
| 5,479,447 A | 12/1995 | Chow et al. |
| 5,852,633 A | 12/1998 | Levin |
| 6,064,692 A | 5/2000 | Chow |
| 6,072,779 A | 6/2000 | Tzannes et al. |
| 6,075,821 A | 6/2000 | Kao et al. |
| 6,393,052 B2 * | 5/2002 | Sadjadpour et al. ........ 375/222 |
| 6,452,981 B1 * | 9/2002 | Raleigh et al. ............ 375/299 |
| 6,516,027 B1 * | 2/2003 | Kapoor et al. ............. 375/227 |
| 6,538,986 B2 * | 3/2003 | Isaksson et al. ............ 370/207 |
| 6,597,745 B1 * | 7/2003 | Dowling ..................... 375/296 |
| 6,608,874 B1 * | 8/2003 | Beidas et al. .............. 375/353 |
| 6,732,281 B1 * | 5/2004 | Mantri et al. .............. 713/300 |
| 6,888,789 B1 * | 5/2005 | Sakoda et al. ............. 370/208 |
| 2002/0122383 A1 * | 9/2002 | Wu et al. ................... 370/210 |

OTHER PUBLICATIONS

J.J. Binney, et al, The Theory of Critical Phenomena: An Introduction to the Renormalization Group, (© 1992 Oxford Science Publications, Oxford) pp. 27-30 and Chapter 5 pp. 113-157.
P.S. Chow, "Bandwidth Optimized Digital Transmission Techniques for Spectrally Shaped Channels with Impulse Noise", Ph.D. thesis, Stanford University, May 1993, pp. ii-187.
A. Cherkaev, "Variational Methods for Structural Optimization", Applied Mathematical Sciences vol. 140.
M.J. Feigenbaum, "The Transition to Aperiodic Behavior in Turbulent Systems", Communications in Mathematical Physics, 1980, pp. 65-86.

(Continued)

*Primary Examiner*—David C. Payne
*Assistant Examiner*—Nader Bolourchi
(74) *Attorney, Agent, or Firm*—McDonnell Boehnen Hulbert & Berghoff LLP

(57) ABSTRACT

A method and apparatus implementing the method, of selecting a bit load b for a channel in a carrier system. The carrier system encodes data based on a constellation of points. Each point represents a tuple of data. The constellation has a self-similarity property. The bit load for the channel is selected based on the self-similarity property of the constellation. In an alternate embodiment, the method and apparatus are used to determine the bit load of the sub-channels in a multi-carrier system.

35 Claims, 10 Drawing Sheets

OTHER PUBLICATIONS

I.S. Gradshteyn, Table of Integrals, Series, and Products—6th Edition, (© 2000, Academic Press).

IEEE Std. 802.11a-1999: Part II: Wireless LAN Medium Access Control (MAC) and Physical Layer (PHY) specifications: High-speed Physical Layer in the 5 GHz Band, IEEE, New York, 1999, pp. 3-82.

ITU Recommendation G.922.1: Asymmetric Digital Subscriber Line (ADSL) Transceivers, Geneva 1999, pp. i-242.

ITU Recommendation G.992.2: Splitterless Asymmetric Digital Subscriber Line (ADSL) Transceivers, Geneva 1999, pp. i-167.

T.J. Lunn et al, "Number of Neighbours for Staged Decoding of Block Coded Modulation", IEE Electronic Letters, 1993, vol. 29, No. 21, pp. 1830-1831.

B.B. Mandelbrot, The Fractal Geometry of Nature, (© 1983, W.N. Freeman and Co., New York) pp. 1-57.

J. Proakis, Digital Communications, (© 1995 McGraw-Hill, New York) pp. 260-263, 278-282, 441, and 464-467.

D. Bertsekas et al, Data Networks, (© 1992, Prentice Hall), pp. 64-86 and 149-240.*

J.A.C. Bingham, "Multicarrier Modulation for Data Transmission: An Idea Whose Time Has Come", IEEE Communications Magazine, May 1990, pp. 5-14.*

W.Y. Chen, DSL: Simulation Techniques and Standards Development for Digital Subscriber Line Systems, (© 1998, MacMillan Technical Publishing), pp. 465, 11, and 119-121.*

P.S. Chow et al, "A Practical Discrete Multitone Transceiver Loading Algorithm for Data Transmission Over Spectrally Shaped Channels", IEEE Transactions on Communications, vol. 43, No. 2/3/4, Feb./Mar./Apr. 1995, pp. 773-775.*

N.G. de Bruijn, Asymptotic Methods in Analysis, (© 1981, Dover Publications, Inc.), pp. 22-23.*

F.J. MacWilliams et al, Chapter 10, Section 10, "Reed-Solomon and Justesen Codes—Decoding RS codes", The Theory of Error-Correcting Codes, (© 1977, Elsevier Science), p. 306.*

V.S. Mitlin, Nonlinear Dynamics of Reservoir Mixtures, (© 1993, CRC Press), pp. 173-177.*

Numerical Recipes in C: The Art of Scientific Computing, (© 1992 Cambridge University Press) pp. 212-221.*

* cited by examiner

METHOD AND APPARATUS FOR EVALUATING ERROR CONTROL PARAMETERS OF SELF-SIMILAR CONSTELLATIONS

The present application is related to application Ser. No. 09/741,636 filed on Dec. 20, 2000, entitled "Performance Evaluation of Multi-Carrier Channels", by inventors Vlad Mitlin and Richard G. C. Williams which is incorporated herein by reference in its entirety.

FIELD OF THE INVENTION

The present invention relates to multi-carrier data communications; and, more particularly, to evaluating the error control parameters of self-similar constellations.

BACKGROUND OF THE DISCLOSURE

Demand for digital subscriber line (DSL) service across existing twisted pair copper wires between a central office and a remote location is increasing. Typically, DSL services operate in accordance with DSL standards recommended by the Telecommunication Standardization Sector of the International Telecommunication Union (ITU). A family of DSL Recommendations from the ITU includes: G.992.1, G.992.2, G.991.1, G.996.1, G.994.1, G.997.1 and G.995.1. Recommendation G.995.1 provides an overview of these standards. Recommendations G.991.1, G.992.1, G.992.2 have developed techniques for transmitting a range of bit rates over the copper wires of the local network including high bit rates at relatively short distances, and lower bit rates at longer distances. In particular, the G.992.1 and G.992.2 recommendations are based on asymmetric digital subscriber line technology that has different data rates in each direction of transmission. The G.992.1 recommendation is referred to as G.dmt and uses a splitter to filter the voice-grade signals at the remote location. The G.992.2 recommendation is referred to as G.lite and does not use a splitter. Recommendations G.994.1, G.996.1 and G.997.1 support the G.992.1 and G.992.2 recommendations by providing common handshake, management and testing procedures. These standards allow substantial flexibility in implementation.

DSL services typically use a discrete multi-tone (DMT) signal to transmit data. A DMT signal has multiple sub-channels, each of which is assigned a frequency, also referred to as a carrier frequency or a tone, belonging to a discrete frequency band. Because individual sub-channels operate at different frequencies, the sub-channels may have different operating characteristics. For instance, more power may be used at higher frequencies. In addition, different numbers of bits may be loaded on different sub-channels in accordance with their capacity, which depends on frequency, power, signal-to-noise ratio and transmission line characteristics. Sub-channels that do not meet or exceed a minimum signal-to-noise ratio are not used. When initiating a DSL communication session, in the DSL modem, an initialization procedure at the receiver determines a number of bits to be grouped into a symbol for each sub-channel, that is, a number of bits per sub-channel, and exchanges that information with the transmitting DSL modem.

Quadrature amplitude modulation (QAM) is a technique to encode multiple bits into a QAM symbol. Each QAM symbol represents a distinct combination of bit values using a distinct combination of amplitude and phase of the carrier waveform. Each QAM symbol is represented by a QAM waveform.

Referring to FIG. 1, a signal space diagram depicts a constellation 14 of a group of distinct QAM symbols 18 that represents combinations of a group of bits. FIG. 1 depicts a 16-point G.992.2 constellation in which the number of bits b is equal to 4. In QAM, the amplitudes of two quadrature carriers are modulated and the carriers are combined. The x-axis 15 represents the amplitude of a first carrier, and the y-axis 16 represents the amplitude of a second carrier that is shifted in phase by 90° with respect to the first carrier. For example, the first carrier is a sine wave, while the second carrier is a cosine wave. Each point 19 represents a distinct combination of the modulated carriers and thus a distinct QAM symbol.

A constellation encoder encodes groups of bits into QAM symbols. For example, for QAM symbols that represent four bits, the constellation will have sixteen distinct QAM symbols and map each of the sixteen possible combinations of the four bits to a distinct one of the QAM symbols.

In DMT systems, the digital information is transformed by a modem into an analog form that is essentially a sequence of DMT symbol waveforms. Each DMT symbol bears information in an array of zeroes and ones, which has several $b_i$-sized sub-arrays. Each sub-array corresponds to a QAM waveform representing a $2^{b_i}$-point constellation. In other words, $b_i$ represents a number of bits per sub-channel i. A DMT symbol waveform is the superposition of these QAM waveforms. The channel itself is characterized by a signal-to-noise ratio $\gamma_i$, where $\gamma_i$ represents the signal-to-noise ratio (SNR) at the $i^{th}$ carrier frequency.

In DMT systems, each sub-channel has a constellation encoder. Typically, in DMT systems, equal error protection is applied, and the number of bits per sub-channel $b_i$ is determined as follows: for each sub-channel, the bit error rate should not exceed a target bit error rate prior to decoding and retransmission $p_b$. One conventional QAM error determination procedure as described by John G. Proakis, in Digital Communications, (Proakis) 1995, on p. 280 yields the QAM symbol error rate rather than the target bit error rate. Evaluating the equivalent bit error rate is known to be a complicated problem (See Proakis, p. 441). Therefore, it is typically assumed that the QAM symbol error rate is approximately equal to the bit error rate. However, this assumption is not precise and, for large QAM constellations, may misevaluate the bit error rate by a factor of ~10.

The assumption of an equally probable constellation decoding error yields an average fraction of erroneous bits that approach ½ at large values of b. In other words, approximately half of the bits will be in error when a QAM symbol error occurs. This approach was earlier used in Proakis, p. 262 for $2^b$-ary orthogonal signals. However, this approach is not precise either. Because this assumption is used when determining the number of bits $b_i$ per sub-channel, an improved method and apparatus are needed to select the number of bits per sub-channel. Furthermore, this assumption does not accommodate for fluctuations in the bit error rate. The method and apparatus should also accommodate for fluctuations in the bit error rate.

Reed-Solomon encoding is a method of forward error correction used in DSL communications to detect and correct transmission errors, effectively increasing the signal-to-noise ratio of the communications channel. By encoding information, errors may be reduced without decreasing the data rate. In Reed-Solomon encoding, redundant symbols are added to information symbols to allow errors to be detected and corrected. As the number of redundant symbols increases, a greater level of noise may be tolerated. Among the transmission parameters to be selected in DSL communications are forward error correction (FEC) parameters for Reed-Solomon encoding. The FEC parameters determine the amount of information data in an information field, and a number of redundancy symbols that are associated with the information field of an information frame. Reed-Solomon encoding parameters for forward error correction are selected while executing the initialization procedure. During initialization, the channel is analyzed and FEC parameters are determined and exchanged. The ITU recommendations set a bit error rate (BER) standard of $10^{-7}$. The Reed-Solomon encoding parameters for forward error correction are selected based on, at least in part, the bit error rate standard and an average number of erroneous bits per QAM symbol. However, there is a need for selecting FEC parameters based on a more precise determination of the average number of erroneous bits per QAM symbol. In addition, there is a need to select FEC parameters based on a target bit error rate that accommodates for fluctuations in the average number of erroneous bits per QAM symbol.

SUMMARY OF THE INVENTION

A method, and apparatus implementing the method, selects a bit load for a channel. The channel may be a single carrier or multi-carrier channel. In one aspect of the invention, the channel has a single carrier. Bits are encoded based on a constellation of points. The constellation has a self-similarity property. The bit load for the channel is selected based on the self-similarity property of the constellation.

In another aspect of the invention, a multi-carrier system encodes bits based on a constellation of points. Each point represents a tuple of bits. The constellation has a self-similarity property. The bit load per sub-channel is selected based on the self-similarity property of the constellation.

In yet another aspect of the invention, the constellation is square. Alternately, the constellation is non-square. In another aspect of the invention, the probabilistic properties of non-square constellations can be described by the same equations that are used for even-bit or square constellations.

BRIEF DESCRIPTION OF THE DRAWINGS

To facilitate understanding, identical reference numerals have been used, where possible, to designate identical elements that are common to some of the figures.

DETAILED DESCRIPTION OF THE PREFERRED EMBODIMENTS

Figure 1:
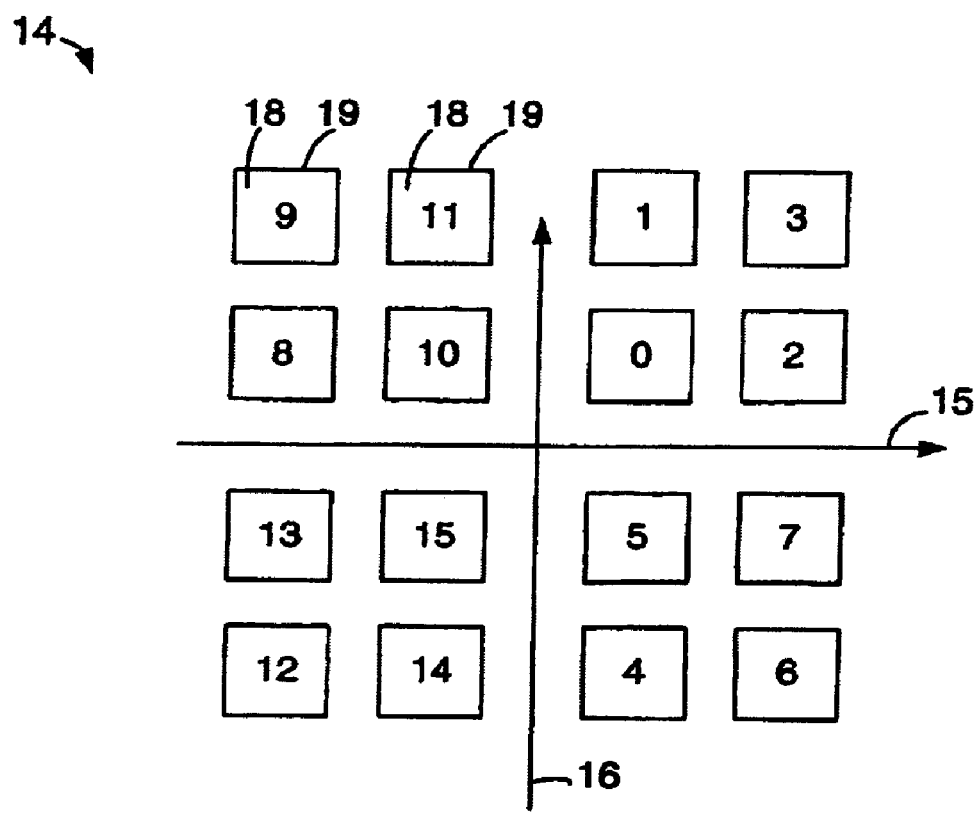
FIG. 1 is a signal space diagram of an exemplary QAM constellation with a number of bits b equal to 4.

A technique for determining the bit load of a channel is based on the error control properties of QAM constellation encoders. In particular, this technique is applied to determining a bit load for a DMT or, which is sometimes referred to as an orthogonal frequency division multiplexed (OFDM), channel.

Often, it is assumed that an error in constellation decoding yields any constellation point with the same probability. This assumption yields a value of ½ for ω, an average fraction of erroneous bits per an erroneous QAM symbol. However, in a bit-error-rate-controlled transmission environment this assumption is not true. It has been suggested that the main contribution to the error-control parameters of QAM constellation encoders is made by the nearest-neighbor errors. However, the expressions for the error control parameters of QAM constellation encoders may be cumbersome because direct calculations on QAM lattices are involved, and may be difficult to use directly in performance evaluation of multi-carrier channels.

The present invention describes a technique to estimate the dependence of error control parameters of QAM constellation encoders with respect to the bit size of the QAM symbol. This technique uses a self-similarity property of QAM constellations, that is, a distribution of a parameter in a sub-block of a constellation looks similar to the whole constellation, but on a smaller scale. In particular, in the present invention, the self-similarity property is the Hamming distances of the points in the constellation. Using the self-similarity property, the probability of having m bit errors in an erroneous b-bit QAM symbol is determined. Based on this result, an average fraction of erroneous bits ω in an erroneous QAM symbol is determined and used to determine the bit load of a channel. When the number of bits of a QAM symbol b is large, the average fraction of erroneous bits ω is approximately inversely proportional to b/2. A parameter called the mean square deviation measures fluctuations in bit error rate (BER) that are inherent to QAM constellation encoders. The dependence of the mean square deviation with respect to the size of the QAM symbol b in an erroneous QAM symbol is determined. The method is developed for square constellations. In an alternate embodiment, non-square constellations are represented as a set of adjacent square constellations of different sizes, therefore reducing the determination of their error-control parameters to that of square constellations. When the constellation size is large, the probabilistic properties of non-square constellations can be described by the same equations that are used for square constellations. This approximation can be used in error control determination for single and/or multicarrier QAM channels where both square and non-square constellation encoders are applied, for example, G.992.2 (G.lite) and G.992.2 (G.dmt) asymmetric digital subscriber line (ADSL) standards.

1. An Exemplary DMT Communications System

Figure 2:
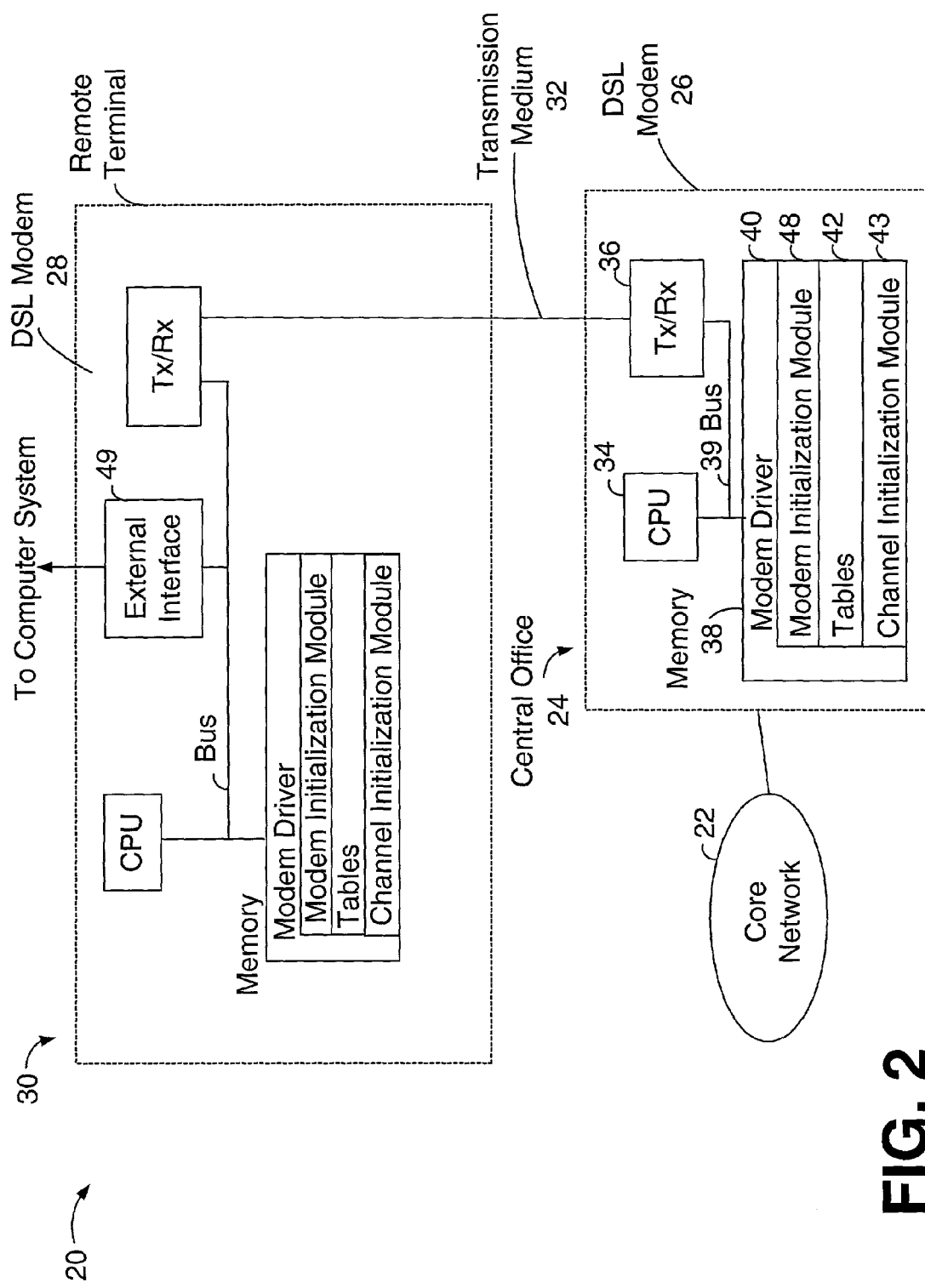
FIG. 2 is a block diagram of a DSL modem at a central office, transmission medium, and DSL modem at a remote terminal.

Referring to FIG. 2, a block diagram of an exemplary discrete multi-tone (DMT) communications system or channel 20 is shown. In one embodiment, the DMT communications system 20 is a DSL system. Alternately, the DMT communications system 20 is an asymmetric DSL (ADSL) system. In another alternate embodiment, the communications system 20 has a single QAM channel. The DMT communications system 20 connects to a core network 22 at a central office 24. The core network 22 may include functions such as a concentrator, a switch and interfaces to broadband and narrowband networks. The DMT communications system 20 has a modem 26 at the central office 24 and a modem 28 at a remote terminal 30 that are interconnected by a transmission medium 32. The modems 26, 28 implement a multicarrier transmission method in accordance with the present invention. The modem 26 at the central office 24 includes a processor (CPU) 34, a transmitter/receiver (Tx/Rx) 36, and a memory 38, which are interconnected by a bus 39. The memory 38 stores a modem driver 40 that is executed by the processor 34, and tables 42 in accordance with various embodiments of the present invention. At least one table 42 stores values representing a number of bits per sub-channel 46 for each of the sub-channels. One or more of the tables 42 store FEC parameters. In one embodiment, the modem driver 40 includes a modem initialization module 48 that generates the various tables of the present invention; and a channel initialization module 43 that accesses the tables to select a bit load. In an alternate embodiment, the channel initialization module 43 is not executed once, but may be executed periodically to monitor the data, update the tables 42, and adjust the FEC parameters, if needed, and also to adjust the number of bits per sub-channel, if needed, during system operation. In another alternate embodiment, the channel initialization module 43 generates the number of bits per sub-channel and FEC parameters based on a measured effective signal-to-noise ratio, rather then the modem initialization module 48. The memory 38 may be implemented using RAM, ROM, or a disk drive, or a combination thereof. In an alternate embodiment, the modem driver procedure 40, and/or portions thereof, may be implemented in hardware using digital logic, for example, using an application-specific integrated circuit (ASIC).

The modem 28 at the remote terminal 30 includes the same components as the modem 26 at the central office 24, and also includes an external interface 50 to connect to a computer system. The external interface 50 may be a PCI, internet, or USB interface. In an alternate embodiment, the modem 38 is internal to the computer system.

The communications channel uses a discrete multitone (DMT) signal to carry data downstream and upstream on the transmission medium 32. The downstream direction is from the central office 24 to the remote terminal 30; and the upstream direction is from the remote terminal 30 to the central office 24. Typically, higher data rates are supported for transmitting data in the downstream direction than the upstream direction.

In another embodiment, the method is applied to DSL systems compliant with the ITU Recommendation G.992.2 standard. The G.992.2 standard specifies allowable sets of Reed-Solomon code parameters that are applied equally across all sub-channels. The optimal coding parameters are found depending on, at least in part, the signal-to-noise ratio (SNR) distribution over the channel's frequency band and on the number of sub-channels used. Alternately, the present invention is applied to a DSL system compliant with the ITU Recommendation G.992.1 standard. In an alternate embodiment, the present invention can be applied to any multicarrier system.

In another embodiment, the transmission medium is twisted pair. Alternately, the transmission medium may be a coaxial cable. In another alternate embodiment, the transmission medium is "wireless," that is, the transmission medium has radio transmitters and receivers to transmit and receive the DMT signal, respectively. Alternately, the transmission medium is implemented optically. In one embodiment, the transmission is performed using an infrared (IR) interface which includes an IR transmitter and an IR receiver. Alternately, the transmission medium is implemented using optical fiber with an optical transmitter and receiver.

Figure 3:
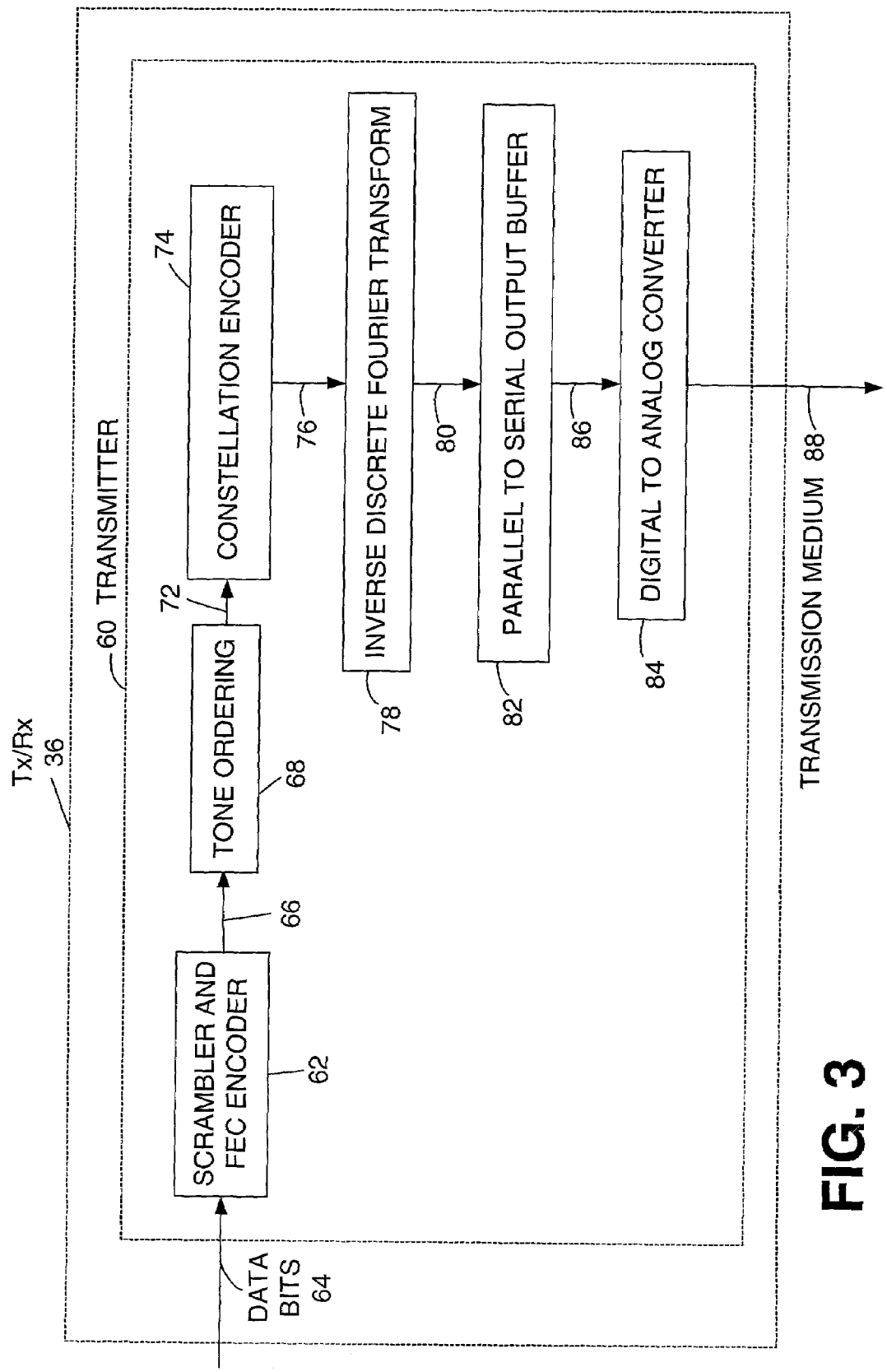
FIG. 3 is a block diagram of a transmitter of the DSL modem of FIG. 2.

FIG. 3 is a block diagram of a transmitter 60 of the transmitter/receiver 36 of FIG. 2. A scrambler and FEC block 62 scrambles an incoming stream of data bits using a predetermined algorithm, and applies FEC to the bits to produce FEC encoded bits on lead 66. A tone ordering block 68 assigns the FEC encoded bits to the usable sub-channels and outputs the assigned FEC encoded bits on leads 72. Constellation encoders 74, one for each sub-channel, convert the FEC encoded bits assigned to a sub-channel to a QAM symbol or constellation point which are output on leads 76. An inverse discrete Fourier transform (IDFT) block 78 modulates the output from the constellation encoders 74 to produce a digital modulated signal representing the superposition of the QAM symbols on lead 80. A parallel-to-serial output buffer 82 stores the digital modulated signal from the IDFT block 78. A digital-to-analog converter (DAC) 84 serially converts the stored digital modulated signal from lead 86 to an analog DMT waveform that is output on lead 88 for transmission. The functions of the blocks 62, 68, 74, 78, 82 and 84 may be implemented completely in hardware as a circuit, or alternately, using a combination of hardware and software.

Figure 4:
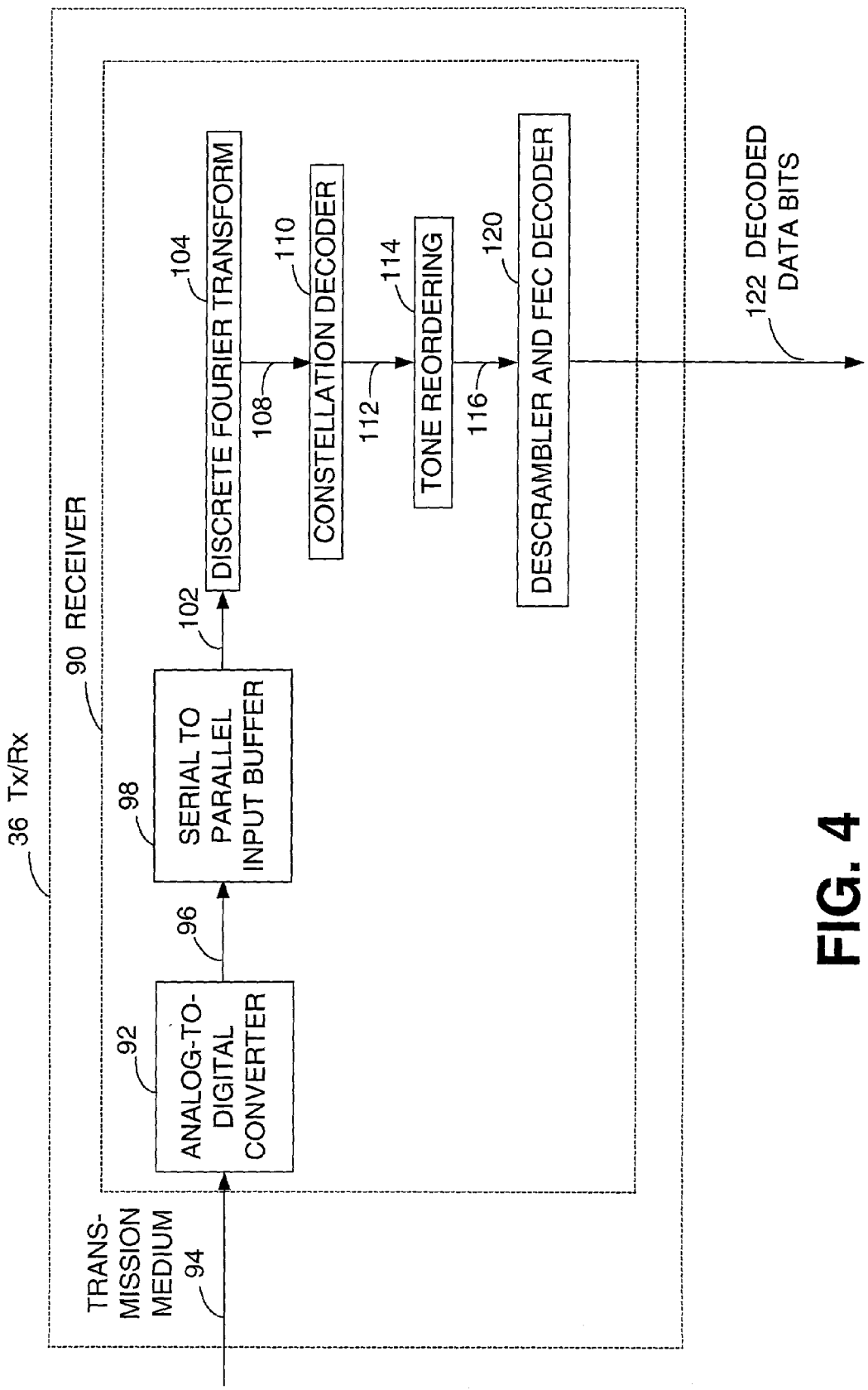
FIG. 4 is a block diagram of a receiver of the DSL modem of FIG. 2.

FIG. 4 is a block diagram of a receiver 90 of the transmitter/receiver 36 of FIG. 2. The receiver 90 performs the inverse of the functions of the transmitter 60 to produce a decoded bit stream from the analog DMT waveform. An analog-to-digital converter 92 receives the analog DMT waveform on lead 94 and converts it to a series of digital values to produce a digital DMT waveform on leads 96. A serial-to-parallel input buffer 98 stores the values of the digital DMT waveform and outputs the values, in parallel, on leads 102 to the discrete Fourier transform block 104. The discrete Fourier transform block 104 demodulates the values of the digital DMT waveform to produce a set of QAM symbols, one for each usable sub-channel, on leads 106. Constellation decoders 110 decode their respective QAM symbols and output respective sets of FEC encoded bits for the usable sub-channels on leads 112. A tone reordering block 114 places the FEC encoded bits in their proper order and outputs the ordered encoded bits on leads 116. The descrambler and FEC decoder 120 corrects for errors using forward error correction and descrambles the bits to reproduce the data stream sent by the transmitter on lead 122.

2. QAM Constellation Encoders

In multicarrier systems, the digital information is transformed by the modem into an analog form that is essentially a sequence of DMT symbol waveforms. Each DMT symbol bears information in an array of zeroes and ones, which has several $b_i$-sized sub-arrays. Each sub-array corresponds to a QAM waveform representing a $2^{b_i}$-point constellation. In other words, $b_i$ represents the number of bits per sub-channel i. A DMT symbol waveform is the superposition of these QAM waveforms. The channel itself is characterized by a signal-to-noise ratio $\gamma_i$, where $\gamma_i$ represents the signal-to-noise ratio (SNR) at the $i^{th}$ carrier frequency.

An average fraction of erroneous bits in an erroneous $b_i$-sized QAM symbol is represented by $\omega(\gamma_i, b_i)$. If $p_{QAM}(\gamma_i, b_i)$ is a symbol error rate, the bit error rate is equal to the product of the symbol error rate and the average fraction of erroneous bits in an erroneous $b_i$-sized QAM symbol, that is, $p_{QAM}(\gamma_i,b_i)\omega(\gamma_i, b_i)$. For a multicarrier system, for each sub-channel, the bit error rate (BER) is less than or equal to the target bit error rate $p_b$ in accordance with the following relationship:

$$BER = p_{QAM}(\gamma_i,b_i)\omega(\gamma_i,b_i) \leq p_b, \quad (2.1)$$

where $p_b$ is the largest BER value allowed in the system past the constellation decoding stage.

In one embodiment, in the absence of a forward error correction block in a transceiver, the G.lite and G.dmt standards specify that the value of the target bit error rate $p_b$ is equal to $10^{-7}$. To improve performance, the number of bits per sub-channel $b_i$ should maximize the left hand side of Equation (2.1).

While an expression for the symbol error rate $p_{QAM}$ is well known from communication theory:

$$p_{QAM}(b_i,\gamma_i) = 1 - [1-(1-2^{-b_i/2})erfc(\sqrt{3 \cdot 10^{\gamma_i/10}/(2^{b_i+1}-2)})]^2 \quad (2.2)$$

an appropriate expression for the average fraction of erroneous bits in an erroneous $b_i$-sized QAM symbol $\omega(\gamma_i, b_i)$ will be determined. The problem is formulated as follows: assuming that a b-sized sub-channel is in error, determine the average fraction of bits in error in such a sub-channel, $\omega(\gamma,b)$.

One way to approach this problem is to assume that if a QAM symbol is received in error, that symbol will result in obtaining any constellation point with the same probability. For a b-bit QAM constellation, this yields:

$$\omega(b) = \frac{1}{b}\sum_{m=1}^{b} m \frac{\binom{b}{m}}{2^b-1} = \frac{2^{b-1}}{2^b-1} \quad (2.3)$$

Equation (2.3) follows from the fact that the probability of having m 1's (m>0) in a randomly chosen binary array of the length b is equal to $$\binom{b}{m} / (2^b-1).$$

Equation (2.3) shows that the assumption of an equally probable constellation decoding error yields an average fraction of erroneous bits in an erroneous symbol $\omega(b)$ that approaches ½ at large values of b. In other words, approximately half of the bits will be in error when a QAM symbol error occurs. This approach was earlier used in Proakis, 1995, p. 262 for $2^b$-ary orthogonal signals.

However, in practice, in a bit-error-rate-controlled transmission environment, the results of decoding an erroneous symbol or point in the constellation tend to group around the correct, that is, the transmitted, constellation point. Usually the results of decoding the erroneous symbol are the nearest neighbors of the correct point on the constellation. For QAM systems, if only the nearest neighbors of a point in a constellation are considered, the problem of computing the average fraction of erroneous bits per symbol $\omega(b)$ becomes geometrical.

Referring back to FIG. 1, in the exemplary 16-point G.992.2 constellation 14, a coordination number represents a number of nearest neighbors to a point. For example, point 6 has two nearest neighbors, points 4 and 7. More generally, for an arbitrary $2^b$-point square constellation, the coordination number is equal to 4 for each internal point, 3 for each external non-corner point, and 2 for each external corner point of a constellation.

Let $a_i$ be the binary representation of the label for the $i^{th}$ point of the constellation. Let $\chi_i$ be the coordination number of this $i^{th}$ point, that is, the total number of nearest neighbors to the $i^{th}$ point in the constellation. Then the average fraction of erroneous bits per symbol $\omega(b)$ is determined in accordance with the following equation:

$$\omega(b) = \frac{1}{b \cdot 2^b} \sum_{i=1}^{2^b} \sum_{j \neq i}^{\chi_i} \frac{d_H(a_i, a_j)}{\chi_i}. \quad (2.4)$$

In Equation (2.4), $d_H(\bullet,\bullet)$ is the Hamming distance between two tuples, and the innermost summation in Equation (2.4) is performed over the nearest neighbors of the tuple or point i. It has been found that $1/\omega(b)$ is an increasing function of the number of bits per sub-channel b. At large values of b, $1/\omega(b)$ increases linearly with a proportionality coefficient of the order of ½. The following relationship for $1/\omega(b)$ has been suggested:

$$1/\omega(b) = (2b+3)/4 \quad (2.5)$$

Equation (2.5) yields the asymptotic behavior discussed above.

Since Equation (2.5) is one possible approximation of Equation (2.4), it is important to determine the average fraction of erroneous bits per symbol $\omega(b)$ based on Equation (2.4). However, solving Equation (2.4) is cumbersome and, for large values of b, is difficult to use in direct calculations of error control parameters. A more general problem is to develop a method of determining other error control parameters of QAM constellation encoders, that is, determine the probability of having m bit errors in an erroneous b-bit QAM symbol. Therefore, the geometrical structure of QAM constellations that directly affects the error control properties of the constellation encoders will be discussed. Initially, square QAM constellations, in which the number of bits b is even, will be discussed.

For a given QAM channel, or alternately, in DMT communications, for a given QAM sub-channel, the constellation encoder selects an odd-integer point (X,Y) from the square-grid constellation based on the binary b-bit array, or tuple, $[v_{b-1}, v_{b-2}, \ldots, v_1, v_0]$. For convenience of description, these b bits are identified with an integer label whose binary representation is $\{v_{b-1}, v_{b-2}, \ldots, v_1, v_0\}$.

Figure 5:
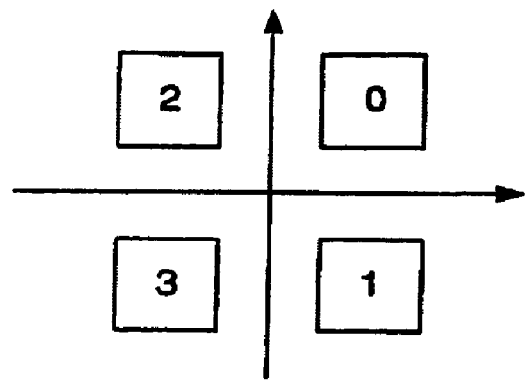
FIG. 5 is a signal space diagram that depicts an exemplary constellation with a number of bits b equal to 2.

Referring to FIG. 5, for example, for b=2, the four constellation points are labeled 0, 1, 2 and 3. The integer values X and Y of the constellation point are determined from the b bits of the input tuple $\{v_{b-1}, v_{b-2}, \ldots, v_1, v_0\}$ as follows. X and Y are the odd integers with 2's complement binary representations $\{v_{b-1}, v_{b-3}, \ldots, v_1, 1\}$ and $\{v_{b-2}, v_{b-4}, \ldots, v_0, 1\}$, respectively. For example, when b=2, and the input bit stream $\{v_1, v_0\}$ is equal to $\{1, 0\}$, X=$\{1,1\}$ and Y=$\{0,1\}$.

Figure 6:
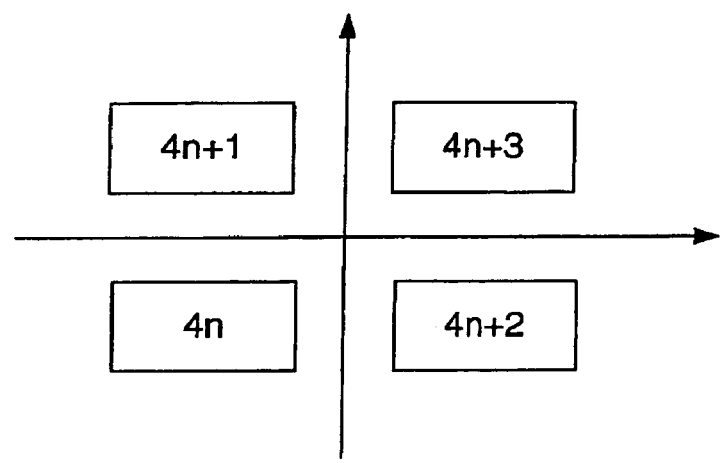
FIG. 6 depicts the expansion of a constellation into the next larger square constellation.

Referring to FIG. 6, a constellation can be expanded into the next larger square constellation. For example, the 4-bit constellation of FIG. 1 can be obtained from a 2-bit constellation by replacing each label n by a 2×2 block of labels. The same procedure can be used to construct larger even-bit constellations recursively. The constellations obtained for even values of b are square in shape.

3. Self-Similarity of Error Control Parameters of QAM Constellation Encoders

A recursive procedure of constructing larger QAM constellations from smaller ones forms the basis for analyzing their error control properties. The following model will be used: assuming that the digital-to-analog conversion yields constellation point i at the transmitter, an error of the constellation decoder at the receiver will yield one of the nearest neighbors of i. Also, assume that a decoding error results, with equal probability, in any of the nearest neighbors of the constellation point i transmitted. Therefore, this probability is equal to one over the coordination number of the constellation point i.

The following proposition will be used.

Proposition 1.

If a, b, c, d, and n are integers such that $c<2^n$, $d<2^n$, and $d_H(\ldots,\ldots)$ is the Hamming distance between the binary representations of two integers, then $$d_H(2^n a+c, 2^n b+d) = d_H(a,b) + d_H(c,d) \quad (3.1)$$

Proof.

Binary representations of $2^n a$ and $2^n b$ have zeroes in their n least significant bits. The total number of bits in binary representations of c and d does not exceed n. Therefore, Equation (3.1) follows directly from the definition of the Hamming distance, e.g., the total number of different bits in two binary arrays.

The following proposition will also be used.

Proposition 2.

Let a and b be the labels of 2 neighbor points with the Hamming distance of $d_h(a,b)$ in a 2n-bit QAM constellation. Let a (2n+2)-bit constellation be generated from a 2n-bit constellation according to the rule shown in FIG. 6. Then the Hamming distance between two neighbor points of two different 2×2 blocks generated out of a and b is equal to $d_h(a,b)+1$.

Proof.

Figure 7:
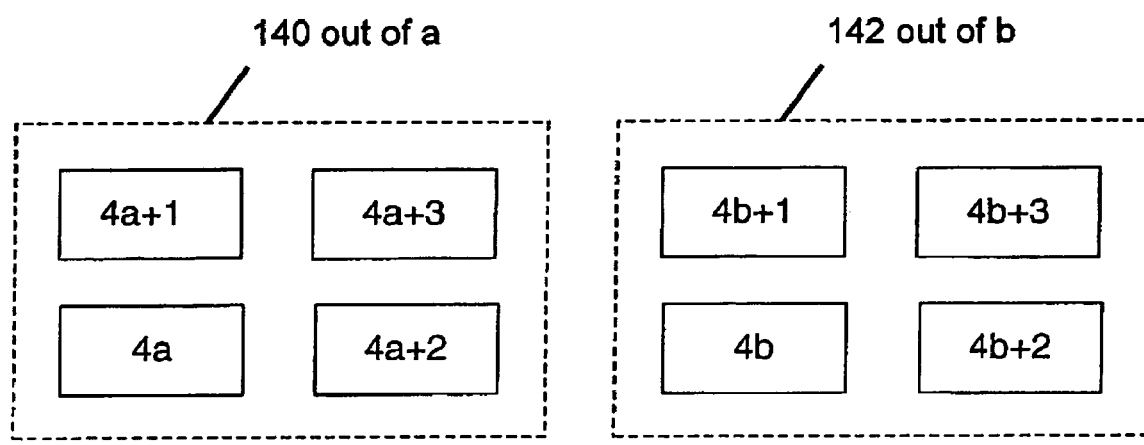
FIG. 7 depicts a construction used to prove proposition 2.

Referring to FIG. 7, any two neighbor points of two different 2×2 blocks 140 and 142 generated out of a and b have the same parity, that is, either both are even, or both are odd. As FIG. 7 depicts the case of b 142 being on the right of a 140, it can be seen that this is true for b being on the left, above, and below a. Applying Equation (3.1) proves the proposition.

Figure 8:
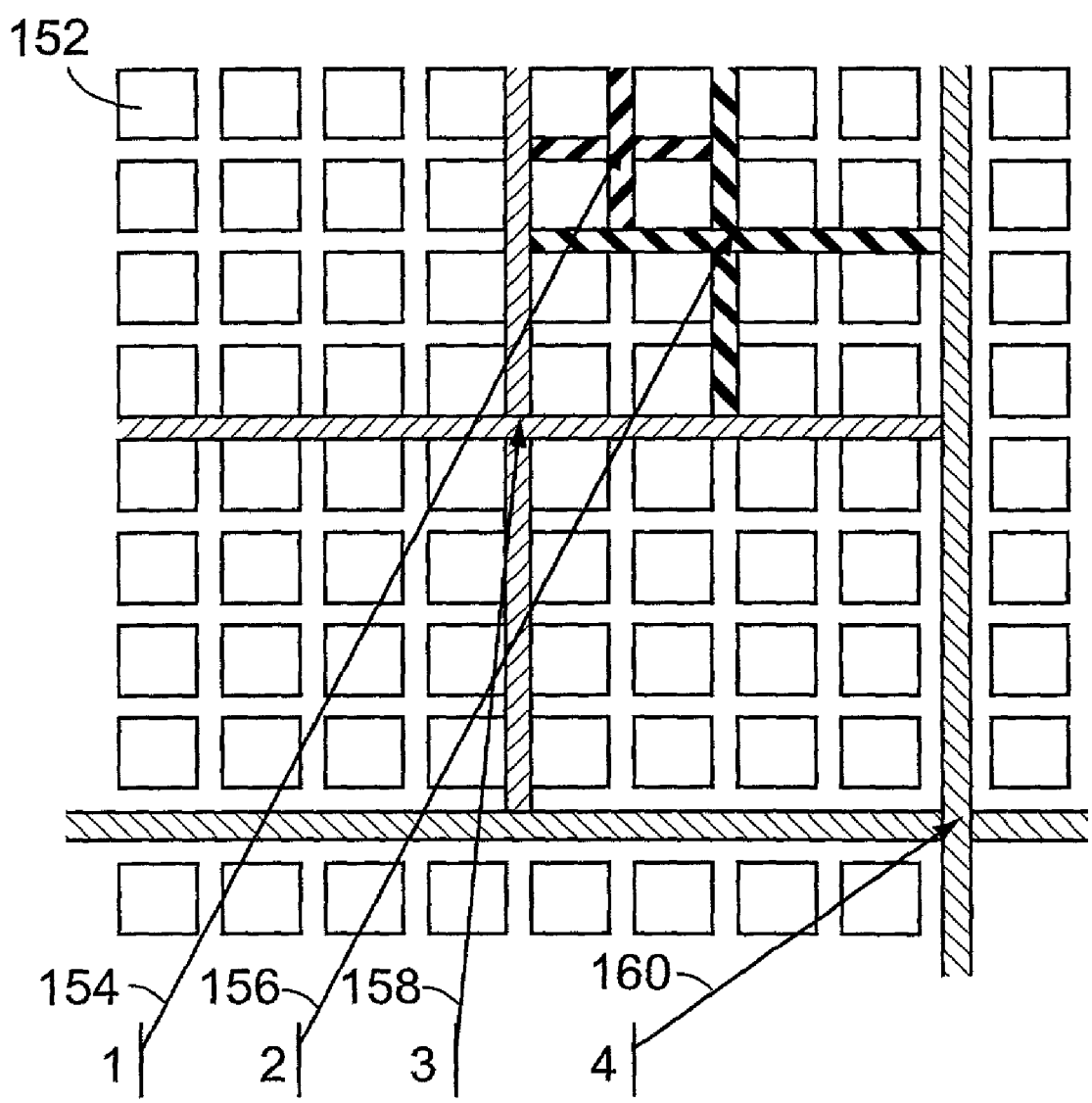
FIG. 8 depicts a geometrical representation of error control properties of QAM constellation encoders using a quarter of a 256-point QAM constellation.

Referring to FIG. 8, propositions 1 and 2 allow the error control properties of QAM constellation encoders to be described geometrically. FIG. 8 depicts a quarter of an 8-bit constellation that has 256 constellation points. Small squares 152 represent the constellation points. Hamming distances of 1, 2, 3 and 4 between the adjacent constellation points are shown by arrows 154, 156, 158 and 160, respectively. Shaded crosses, indicated by the arrows, represent the boundaries separating any two points with the Hamming distance of n. For instance, if a decoding error yields a point lying across the 4-boundary, the incorrect decoding yields 4 bit errors; across the 3-boundary yields 3 bit errors; across the 2-boundary yields 2 bit errors; and across the 1-boundary yields 1 bit error. The constellation of FIG. 8 has one 4-cross having a linear size of 16, four 3-crosses having a linear size of 8, $4^2$ 2-crosses having a linear size of 4, and $4^3$ 1-crosses having a linear size of 2.

Another way to consider the error control properties of QAM constellations is to examine the distribution of Hamming distances along a horizontal or vertical line across a constellation. In the $2^2$-point constellation, the distribution of Hamming distances is:

1.

In the $2^4$-point constellation the distribution of Hamming distances is:

1 2 1.

In the $2^6$-point constellation the distribution of Hamming distances is:

1 2 1 3 1 2 1.

Generally, the distribution in a larger $2^{b+2}$-point square constellation can be generated from the distribution in a smaller $2^b$-point constellation by increasing the values in the latter distribution by one and then inserting 1's at the beginning, between each two neighbors, and at the end.

The distribution of Hamming distances repeats itself inside smaller blocks of the constellation. There is a central cross in each square block, and the constellation neighbors separated by the cross have the maximal Hamming distance in the block. Each of the four sub-blocks of the square block with the n-error central cross repeats the pattern having an (n−1)-error central cross. Such a geometrical structure is called self-similar.

Examples of self-similar structures are well-known in modem fractal theory, the hydrodynamic analysis of turbulence, the theory of critical phenomena, and the mechanics of composite materials. Self-similarity can be considered as a kind of advanced symmetry. In the present invention, the self-similar properties of QAM constellations are used to determine the error control parameters for constellation decoders.

4. Analysis of the Error Probability Distribution of QAM Constellation Encoders

Referring to FIG. 8, consider a square b-bit QAM constellation represented by a $2^N \times 2^N$ square; thus the number of bits b is equal to 2N, b=2N. The coordination number $\chi_i$ of the $i^{th}$ point is equal to the total number of nearest neighbors to the $i^{th}$ point in the constellation. Using the nearest-neighbor-error supposition above, the probability of having k bit errors in an erroneously decoded QAM symbol or tuple is determined as follows:

$$p(k, b) = \frac{1}{2^b} \sum_{i=1}^{2^b} \sum_{\substack{d_H(a_i, a_j)=k \\ j \neq i}}^{\chi_i} \frac{1}{\chi_i}. \quad (4.1)$$

An (i,j)-link represents an edge starting at the constellation point i and ending in a nearest neighbor point j. The weight of a (i,j)-link is equal to one over the coordination number ($1/\chi_i$). The maximum number of bit errors that can be made in an erroneously decoded tuple, under the nearest-neighbor-error supposition, is equal to N. The links intersecting the central cross of the $2^N \times 2^N$ square contribute to the probability of having N bit errors in an erroneously decoded tuple p(N,b) in accordance with the following relationship:

$$p(N, b) = \frac{1}{2^{2N}} \left[ \frac{1}{4} \cdot 4 \cdot 2^N + 8\left(\frac{1}{3} - \frac{1}{4}\right) \right]. \quad (4.2)$$

Equation (4.2) accounts for the fact that 8 links corresponding to 4 end points of the cross have a weight of ⅓, not ¼.

Similarly, the probability of having N−1 bit errors in an erroneously decoded tuple p(N−1, b) is contributed by all the links intersecting the central crosses of the four adjacent $2^{N-1} \times 2^{N-1}$ squares forming the b-bit constellation in accordance with the following relationship:

$$p(N-1, b) = \frac{1}{2^{2N}} \left[ 4 \cdot \frac{1}{4} \cdot 4 \cdot 2^{N-1} + 2 \cdot 8\left(\frac{1}{3} - \frac{1}{4}\right) \right]. \quad (4.3)$$

Equation (4.3) accounts for the fact that 16 links corresponding to 8 end points of the 4 crosses have the weight of ⅓, not ¼.

Generally, the probability of having N−i bit errors in an erroneously decoded tuple p(N−i, b) is contributed by all the links intersecting the central crosses of the $4^i$ adjacent squares with the sizes $2^{N-i} \times 2^{N-i}$ forming the b-bit constellation in accordance with the following relationship:

$$p(N-i, b) = \frac{1}{2^{2N}} \left[ 2^{N+i} + 8\left(\frac{1}{3} - \frac{1}{4}\right) 2^i \right], \; 0 \leq i \leq N-2 \quad (4.4)$$

Equation (4.4) describes the probabilities of having k=N−i bit errors in decoding a QAM symbol, for k>1. At k=], the probability is determined in accordance with the following relationship:

$$p(1, b) + \sum_{i=0}^{N-2} p(N-i, b) = p(1, b) + \frac{1}{2^{2N}} \sum_{i=0}^{N-2} \left[ 2^{N+i} + 8\left(\frac{1}{3} - \frac{1}{4}\right) 2^i \right] \equiv 1 \quad (4.5)$$

Performing the summation in Equation (4.5) yields:

$$p(1, b) = \frac{1}{2^{2N}} \left[ 2^{2N-1} + \frac{4}{3} \cdot 2^{N-1} + \frac{2}{3} \right]. \quad (4.6)$$

Finally, noting that in the above equations i=b/2−k and N=b/2 yields:

$$p(k, b) = \frac{1}{2^k} \left[ 1 + \frac{2}{3 \cdot 2^{b/2}} \right] + \frac{1}{2^k} \frac{2}{3} \left[ \frac{1}{2^{b/2}} + \frac{2}{2^b} \right] \delta_{1k}, \quad (4.7)$$

$1 \leq k \leq b/2$ $$\delta_{ij} = \begin{cases} 1, & \text{where } i = j \\ 0, & \text{where } i \neq j \end{cases}$$

Equation (4.7) shows that at large values of b, the probability of having k bit errors in decoding a b-sized QAM symbol is determined in accordance with the following relationship:

$$p(k, b) = \frac{1}{2^k} \left[ 1 + O\left(\frac{1}{2^{b/2}}\right) \right], \; 1 \leq k \leq b/2. \quad (4.8)$$

and is asymptotically independent of b. In other words, for large constellations that have large values of b, the probability of having k bit errors approaches $\frac{1}{2^k}$.

5. Average Number of Bit Errors in an Erroneous Tuple

Equation (4.7) allows the error control parameters of square QAM constellation encoders to be calculated. First, an average number of bit errors in an erroneous tuple $\langle n_e \rangle$ is determined by applying Equation (4.7) to yield:

$$\langle n_e \rangle = \sum_{k=1}^{b/2} k \cdot p(k, b) = \left(1 + \frac{2}{3 \cdot 2^{b/2}}\right) \sum_{k=1}^{b/2} \frac{k}{2^k} + \frac{1}{3}\left(\frac{1}{2^{b/2}} + \frac{2}{2^b}\right). \quad (5.1)$$

Since the sum on the right hand side of Equation (5.1) is equal to:

$$\sum_{k=1}^{n} \frac{k}{2^k} = 2\left(1 - \frac{1}{2^n} - \frac{n}{2} \cdot \frac{1}{2^n}\right), \quad (5.2)$$

Equation (5.1) can be rewritten in the following form:

$$\langle n_e \rangle = 2\left(1 + \frac{2}{3 \cdot 2^{b/2}}\right)\left(1 - \frac{1}{2^{b/2}} - \frac{b}{4} \cdot \frac{1}{2^{b/2}}\right) + \frac{1}{3}\left(\frac{1}{2^{b/2}} + \frac{2}{2^b}\right) = \quad (5.3)$$

$$2 - \frac{1}{3 \cdot 2^{b/2}} - \frac{2}{3 \cdot 2^b} - \frac{b}{2 \cdot 2^{b/2}} - \frac{b}{3 \cdot 2^b} =$$

$$\frac{12 \cdot 2^b - (3b + 2)2^{b/2} - 2b - 4}{6 \cdot 2^b}$$

At large values of b, the average number of bit errors in an erroneous tuple $\langle n_e \rangle$ tends to 2. Therefore, setting ω(b) to equal $\langle n_e \rangle/b$, the average number of bit errors per erroneous symbol ω(b) is equal to:

$$\omega(b) = \frac{12 \cdot 2^b - (3b + 2)2^{b/2} - 2b - 4}{6b \cdot 2^b} \quad (5.4)$$

Equation (5.4) shows that at large values of b, the value of 1/ω(b) tends to b/2. This is what was observed when computing the average number of bit errors per symbol ω(b) directly from Equation (2.4) and in numerical simulations of a QAM channel, and is contrary to the value of 2 discussed above.

6. Mean Square Deviation of the Number of Bit Errors in an Erroneous Tuple

Similarly, higher moments of p(k,b) and the average number of bit errors in an erroneous tuple $<n_e>$ can be determined. In particular, the second moment of the average number of bit errors in an erroneous tuple $<n_e>$ will be determined, and an expression for the mean square deviation of the number of bit errors in an erroneous tuple, $\sigma_e$, will be derived.

First, the second moment of p(k) is determined in accordance with the following relationship:

$$\langle n_e^2 \rangle = \sum_{k=1}^{b/2} k^2 \cdot p(k, b) = \left(1 + \frac{2}{3 \cdot 2^{b/2}}\right) \sum_{k=1}^{b/2} \frac{k^2}{2^k} + \frac{1}{3}\left(\frac{1}{2^{b/2}} + \frac{2}{2^b}\right) \quad (6.1)$$

It is shown, below, that $$\sum_{k=1}^{n} \frac{k^2}{2^k} = 6 - \frac{n^2 + 4n + 6}{2^n}. \quad (6.2)$$

Using Equation (6.2), Equation (6.1) can be rewritten as follows:

$$\langle n_e^2 \rangle = \left(1 + \frac{2}{3 \cdot 2^{b/2}}\right)\left(6 - \frac{b^2 + 8b + 24}{4 \cdot 2^{b/2}}\right) + \frac{1}{3}\left(\frac{1}{2^{b/2}} + \frac{2}{2^b}\right) \quad (6.3)$$

Combining Equations (6.3) and (5.4) yields the final expression for $\sigma_e$:

$$\sigma_e^2 = \langle n_e^2 \rangle - \langle n_e \rangle^2 \quad (6.4)$$

$$= \left(1 + \frac{2}{3 \cdot 2^{b/2}}\right)\left(6 - \frac{b^2 + 8b + 24}{4 \cdot 2^{b/2}}\right) + \frac{1}{3}\left(\frac{1}{2^{b/2}} + \frac{2}{2^b}\right) -$$

$$\left(\frac{12 \cdot 2^b - (3b+2)2^{b/2} - 2b - 4}{6 \cdot 2^b}\right)^2$$

$$= 2 - \frac{3b^2 + 24b + 20}{12 \cdot 2^{b/2}} + \frac{(6b+4)2^{b/2} - b^2 - 4}{6 \cdot 2^b} +$$

-continued $$\left(\frac{(3b+2)2^{b/2} + 2b + 4}{3 \cdot 2^b}\right)^2$$

At large values of b, $\sigma_e$ tends to the square root of two.

Equation (6.4) yields a measure of the bit error rate fluctuations that are associated with using QAM constellation encoders. Therefore, $\sigma_e$ determines the relative range of the BER fluctuations past the constellation decoding stage, i.e.:

$$\frac{\Delta(BER)}{BER} \sim \sigma_e \quad (6.5)$$

Table 1, below, presents at least a portion of the error control parameters of square QAM constellation encoders for values of b varying between 2 and 32. As shown in Table 1, $1/\omega(b)$ increases linearly at large values of b. Both $<n_e>$ and $\sigma_e^2$ monotonically increase, approaching the value of 2 at large b.

TABLE 1

Error control parameters of QAM b-bit constellation encoders.

| b | $\omega(b)$ | $1/\omega(b)$ | $<n_e>$ | $\sigma_e^2$ | $\sigma_e$ |
|---|---|---|---|---|---|
| 2 | 5.000000e-001 | 2 | 1 | 0 | 0 |
| 4 | 3.229167e-001 | 3.096774e+000 | 1.291667e+000 | 2.065972e-001 | 4.545297e-001 |
| 6 | 2.569444e-001 | 3.891892e+000 | 1.541667e+000 | 5.190972e-001 | 7.204840e-001 |
| 8 | 2.145182e-001 | 4.661608e+000 | 1.716146e+000 | 8.543226e-001 | 9.242958e-001 |
| 10 | 1.829427e-001 | 5.466192e+000 | 1.829427e+000 | 1.162311e+000 | 1.078105e+000 |
| 12 | 1.583252e-001 | 6.316114e+000 | 1.899902e+000 | 1.416250e+000 | 1.190063e+000 |
| 14 | 1.387416e-001 | 7.207642e+000 | 1.942383e+000 | 1.609229e+000 | 1.268554e+000 |
| 16 | 1.229598e-001 | 8.132741e+000 | 1.967356e+000 | 1.746971e+000 | 1.321730e+000 |
| 18 | 1.100970e-001 | 9.082902e+000 | 1.981745e+000 | 1.840604e+000 | 1.356689e+000 |
| 20 | 9.949509e-002 | 1.005075e+001 | 1.989902e+000 | 1.901852e+000 | 1.379077e+000 |
| 22 | 9.065747e-002 | 1.103053e+001 | 1.994464e+000 | 1.940705e+000 | 1.393092e+000 |
| 24 | 8.320785e-002 | 1.201810e+001 | 1.996988e+000 | 1.964748e+000 | 1.401695e+000 |
| 26 | 7.686047e-002 | 1.301059e+001 | 1.998372e+000 | 1.979325e+000 | 1.406885e+000 |
| 28 | 7.139733e-002 | 1.400613e+001 | 1.999125e+000 | 1.988016e+000 | 1.409970e+000 |
| 30 | 6.665107e-002 | 1.500351e+001 | 1.999532e+000 | 1.993123e+000 | 1.411780e+000 |
| 32 | 6.249221e-002 | 1.600199e+001 | 1.999751e+000 | 1.996089e+000 | 1.412830e+000 |

For example, fluctuations in the bit error rate may cause the bit error rate to exceed the target bit error rate. Therefore, an adjusted target bit error rate can be determined using the standard deviation of Table 1 for a specified constellation size. To accommodate for fluctuations, Equation 6.5 is rewritten as follows:

$$\frac{\Delta(BER)}{BER} = \sigma_e = \frac{(BER' - BER_o)}{BER_o}, \quad (6.6)$$

where $BER_o$ represents the adjusted target bit error rate, and $BER'$ represents the unadjusted target bit error rate. For example, for a constellation with a number of bits b equal to 32, the mean square deviation $\sigma_e$, is equal to 1.41283 and a target bit error rate $BER'$ of $10^{-7}$, solving Equation (6.6) yields an adjusted bit error rate $BER_o$ of $0.415 \times 10^{-7}$. The adjusted target bit error rate $BER_o$ may then be used in subsequent calculations to determine FEC parameters. In this way, fluctuations in the bit error rate are accommodated, and the system error rate will meet the unadjusted target bit error rate.

The derivation of Equation 6.2 will now be described. Consider the following function:

$$f(x) = \sum_{k=0}^{n} \frac{x^{k+2}}{2^k}. \qquad (6.7)$$

Rewriting Equation (6.7) yields:

$$f(x) = x^2 \frac{\left(\frac{x}{2}\right)^{n+1} - 1}{\frac{x}{2} - 1} = \frac{x^{n+3}}{2^n(x-2)} - \frac{2x^2}{x-2}. \qquad (6.8)$$

Differentiating Equation (6.7) twice, the following equality holds:

$$f''(1) = \Sigma_2 + 3\Sigma_1 + 2\Sigma_0 \qquad (6.9)$$

where $$\Sigma_i = \sum_{k=0}^{n} \frac{k^i}{2^k}. \qquad (6.10)$$

As $$\Sigma_0 = 2 - 2^{-n} \qquad (6.11)$$

$$\Sigma_1 = 2 - 2^{-n}(n+2) \qquad (6.12)$$

and $$f''(1) = 16 - \frac{(n+3)(n+4) + 2}{2^n} \qquad (6.13)$$

combining Equations (6.9) to (6.13) yields Equation (6.2).

7. Non-Square Self-Similar Constellation Encoders.

Figure 9:
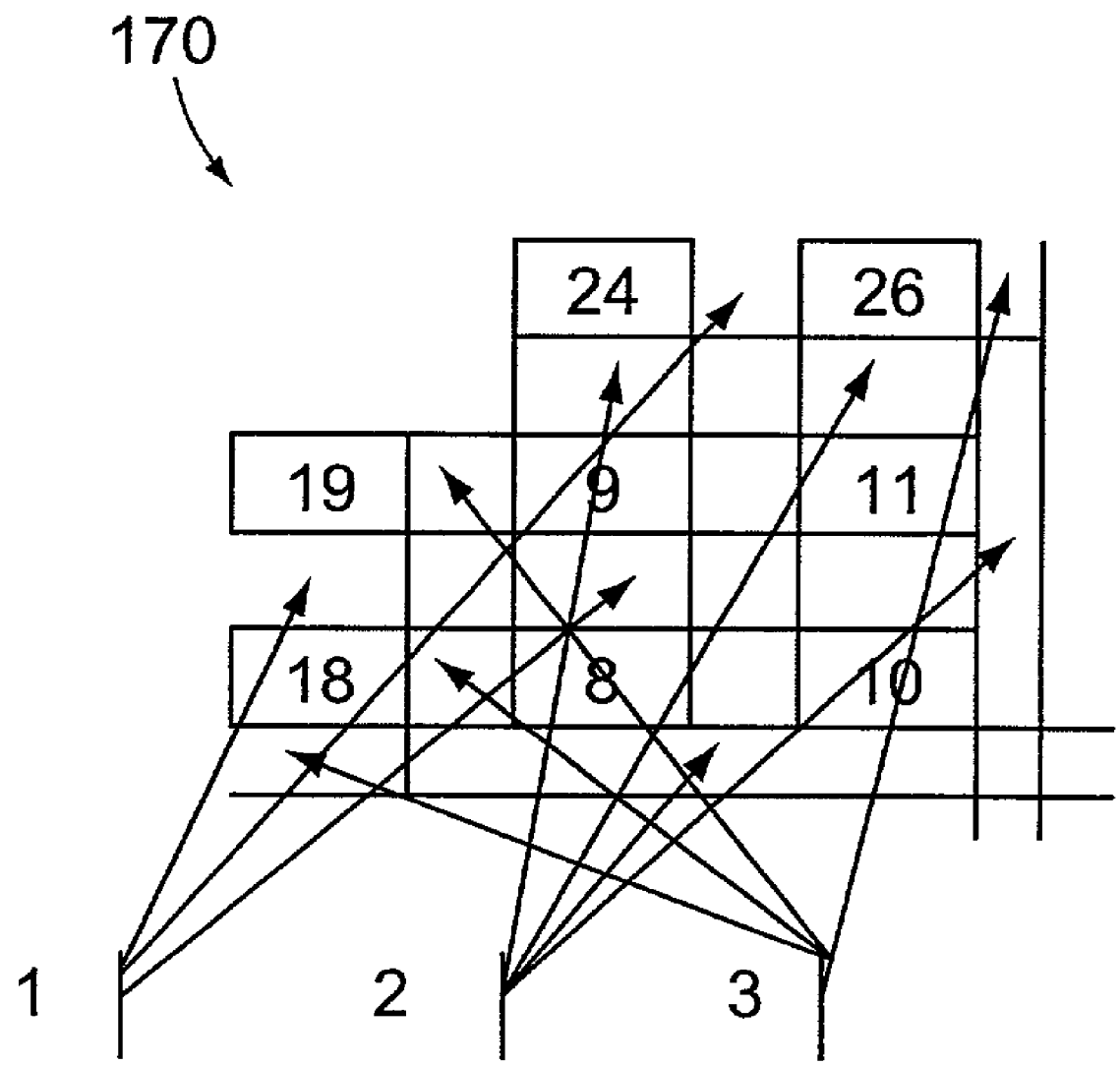
FIG. 9 depicts a geometrical representation of error control properties of an odd-bit QAM constellation encoder, that is, a quarter of 32-point QAM constellation.

The method of estimating error-control parameters developed above for square QAM constellation encoders is extended to non-square constellations which have an odd number of bits b. A non-square constellation can be represented as a set of adjacent square sub-constellations of different sizes, therefore reducing the determination of its error-control parameters to the basic case considered in the present invention. FIG. 9 presents an upper left quarter 170 of a 32-point QAM constellation used in G.lite/G.dmt ADSL standards. Hamming distances of 1, 2, and 3 between adjacent constellation points are shown by arrows.

The entire constellation can be described as a 16-point QAM sub-constellation shown in FIG. 1, with 16 adjacent points over the perimeter of the 16-point QAM constellation. The next odd-bit constellation, a 128-point QAM constellation, is generated from the 16-point constellation following the rule shown in FIG. 6. The rule of FIG. 6 may be repeatedly applied to generate larger constellations. Therefore, the larger constellations have one central $2^{2N}$-point QAM sub-constellation and 16 adjacent $2^{2N-4}$-point QAM sub-constellations.

For a general, not necessarily square QAM constellation, the probability of having k bit errors in an erroneous QAM symbol is determined in accordance with the following relationship:

$$p(k, b_1, \ldots, b_J) = \qquad (7.1)$$

$$\sum_{j=1}^{J} \frac{2^{b_j}}{2^b} p(k \mid \text{symbol transmitted } \epsilon\Omega_j \text{ \& symbol received } \epsilon\Omega_j) +$$

$$\sum_{\substack{j,m \\ m \neq j}}^{J} [p(\text{symbol transmitted } \epsilon\Omega_j \text{ \& symbol received } \epsilon\Omega_m) \times$$

$$p(k \mid \text{symbol transmitted } \epsilon\Omega_j \text{ \& symbol received } \epsilon\Omega_m)]$$

where $2^{b_j}$, is the number of constellation points in each of J adjacent square sub-constellations $\Omega_j$ forming the non-square constellation considered, and sub-constellation $\Omega_j$ is different from sub-constellation $\Omega_m$; and the following condition holds:

$$\sum_{j=1}^{J} \frac{2^{b_j}}{2^b} = 1. \qquad (7.2)$$

Notice that the Hamming distance between two neighbor points belonging to the same $2^{b_j}$-point square sub-constellation is not larger than $b_j/2 \leq b/2$. However, if two neighbor points of the constellation belong to different (adjacent) sub-constellations, the Hamming distance between them can exceed b/2. For instance, the Hamming distance between the points labeled by 9 and 19 in FIG. 9 is equal to 3.

Various non-square constellation encoders look like a set of adjacent square constellations of different sizes. As evaluating $p(k, b_1, \ldots, b_J)$ from Equation (7.1) in each specific case of a non-square constellation is quite cumbersome, the following general result can be derived:

Proposition 3.

Let a non-square $2^b$-point QAM constellation consist of J adjacent square sub-constellations. Let each $2^b$-point sub-constellation have been generated recursively according to the rule shown in FIG. 6. Denote $$b_* = \min b_j, j=1, \ldots J.$$

Then at large $b_j$, $j=1, \ldots, J$, and at $1 \leq k \leq b_*/2$, $p(k, b_1, \ldots, b_J)$ becomes asymptotically close to p(k,b), the error probability distribution of a square constellation encoder (Equation (4.7)):

$$p(k,b_1, \ldots, b_J) \to p(k,b), \text{ as } b_j \to \infty, j=1, \ldots J$$

Proof.

Consider different terms in Equation (7.1). To determine the first conditional probability in the first sum on the right hand side of Equation (7.1), Equation (4.7) is used at $1 \leq k \leq b_*/2$, or, alternately, Equation (4.8) is used at large values of $b_j$, for each sub-constellation. Generally, this conditional probability, as determined by Equation (4.8), is complemented by a correction term. This correction term accounts for the change in the coordination number of some external points of a square $b_j$-bit sub-constellation as a result of bringing it in contact with another sub-constellation. For instance, a point with the value of 11 in FIG. 9 has the coordination number of 3 in a standalone square 16-point QAM constellation; but its coordination number is equal to 4 as a part of the 32-point QAM constellation. The ratio of this correction term to the value given by Equation (4.8) is of the order of the ratio of the perimeter of a $2^{b_j/2} \times 2^{b_j/2}$ square to its area:

correction term $\sim 2^{b_j/2}/2^{b_j} = 2^{-b_j/2} \to 0$, as $b_j \to \infty$ Similarly, under the nearest-neighbor-error supposition, the first probability of the product in the second sum on the right hand side of Equation (7.1) is of the order of the ratio of the perimeter of a $2^{b_j/2} \times 2^{b_j/2}$ square to the total number of constellation points $2^b$, i.e., $\sim 2^{b_j/2}/2^b$. The second—conditional—probability is, again, of the order of the ratio of the perimeter of a $2^{b_j/2} \times 2^{b_j/2}$ square to its area, i.e., $\sim 2^{-b_j/2}$. Evaluating the whole expression in Equation (7.1) at large $b_j$, $j=1, \ldots, J$, yields:

$$p(k, b_1, \ldots, b_J) = \sum_{j=1}^{J} \frac{2^{b_j}}{2^b} \frac{1}{2^k}\left[1 + O\left(\frac{1}{2^{b_i/2}}\right)\right] + O\left(\frac{1}{2^b}\right) \quad (7.3)$$

Using inequalities $1 \leq k \leq b_*/2$ and $b_j < b$, $j=1, \ldots, J$, and applying Equation (7.2) to Equation (7.3) yields:

$$p(k, b_1, \ldots, b_J) = \quad (7.4)$$

$$\frac{1}{2^k}\sum_{j=1}^{J}\frac{2^{b_j}}{2^b}\frac{1}{2^k}\sum_{j=1}^{J}\frac{2^{b_j}}{2^b}O\left(\frac{1}{2^{b_1/2}}\right) + \frac{1}{2^k}O\left(\frac{2^k}{2^b}\right) = \frac{1}{2^k}\left[1 + O\left(\frac{1}{2^{b/2}}\right)\right]$$

Finally, combining Equations (4.7) and (7.4) yields:

$$p(k, b_1, \ldots, b_J) = \frac{1}{2^k}\left[1 + O\left(\frac{1}{2^{b/2}}\right)\right] = p(k, b)\left[1 + O\left(\frac{1}{2^{b/2}}\right)\right] \quad (7.5)$$

Details of the asymptotic structure of the $p(k, b_1, \ldots, b_J)$ "tail" at $k > b_*/2$ can be described in the following extension of Proposition 3.

Proposition 4. Let a non-square $2^b$-point QAM constellation consist of $J_1$ $2^{b_1}$-point, $J_2$ $2^{b_2}$-point, $\ldots$, and $J_M$ $2^{b_M}$-point adjacent square sub-constellations, $$\sum_{m=1}^{M} J_m = J$$

and $b_1 < b_2 < \ldots < b_M < b$

Let each sub-constellation have been generated recursively according to the rule shown in FIG. 6. At large $b_m$, $m=1, \ldots, M$, $$p(k, b_1, \ldots, b_J) = p(k, b)\left[1 + O\left(\frac{1}{2^{b/2}}\right)\right], \quad \text{as } 1 \leq k \leq b_1/2 \quad (7.6)$$

$$p(k, b_1, \ldots, b_J) = p(k, b)\left(1 + J_1\frac{2^{b_1}}{2^b}\right)\left[1 + O\left(\frac{1}{2^{b/2}}\right)\right], \quad (7.7)$$

as $b_1/2 < k \leq b_2/2$ $$p(k, b_1, \ldots, b_J) = p(k, b)\left(1 - J_1\frac{2^{b_1}}{2^b} - \ldots - J_m\frac{2^{b_m}}{2^b}\right)\left[1 + O\left(\frac{1}{2^{b/2}}\right)\right], \quad (7.8)$$

as $b_m/2 < k \leq b_{m+1}/2$

...

$$p(k, b_1, \ldots, b_J) = p(k, b) \cdot J_M \frac{2^{b_M}}{2^b}\left[1 + O\left(\frac{1}{2^{b/2}}\right)\right], \quad (7.9)$$

as $b_{M-1}/2 < k \leq b_M/2$ $$p(k, b_1, \ldots, b_J) = O\left(\frac{1}{2^b}\right), \quad \text{as } k > b_M/2 \quad (7.10)$$

Proof

Equation (7.6) has been proven in Proposition 3.

At $b_m/2 \leq k \leq b_{m+1}/2$ the first summation on the right hand side of Equation (7.1) is performed only over the sub-constellations with bit sizes larger than $b_m$, that is, in sub-constellations with smaller bit-size there cannot be two neighbor points with the Hamming distance larger than $b_m/2$. At $k > b_M/2$ $p(k, b_1, \ldots, b_J)$ in Equation (7.1) is represented by the second sum only. There cannot be two neighbor points in the same square sub-constellation with the Hamming distance larger than $b_M/2$. Therefore, Equations (7.7) to (7.10) follow directly from Equations (7.3) and (7.4).

Propositions 3 and 4 form a basis for approximating the main error correction properties (i.e., any probability distribution moment of interest) of a general, not necessarily square, constellation encoder by equations developed above for square constellation encoders. This approximation can be used in error control calculations for QAM channels where both square and non-square constellation encoders are applied, for instance, in the G.lite/G.dmt ADSL standards. Since the series for determining moments (e.g., Equations (5.1) or (6.1)) are convergent, the contribution of the $p(k, b_1, \ldots, b_J)$ "tail" at $k > b_*/2$ to these moments becomes negligible, as the sub-constellations sizes increase. The larger the constellation size, the more precise this approximation will be.

8. Selecting a Bit Load

Figure 10:
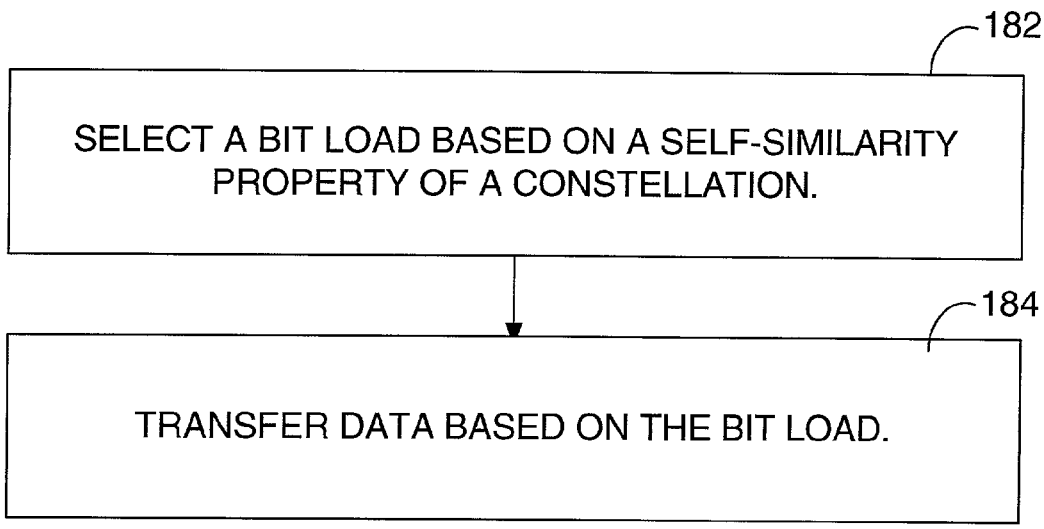
FIG. 10 is a general flowchart of a modem initialization module that determines a bit load based on a self-similarity property of a constellation in accordance with an embodiment of the present invention.

Referring to FIG. 10, a general flowchart of the present invention is shown. The modem initialization module 48 (FIG. 2) implements the method of the present invention. In step 182, a bit load is selected based on a self-similarity property of a constellation. In addition, one or more FEC parameters are also selected based on the self-similarity property. In step 184, data is transferred based on the bit load and FEC parameters. Alternately, the channel initialization module 43 (FIG. 2) implements the method of FIG. 10.

Figure 11:
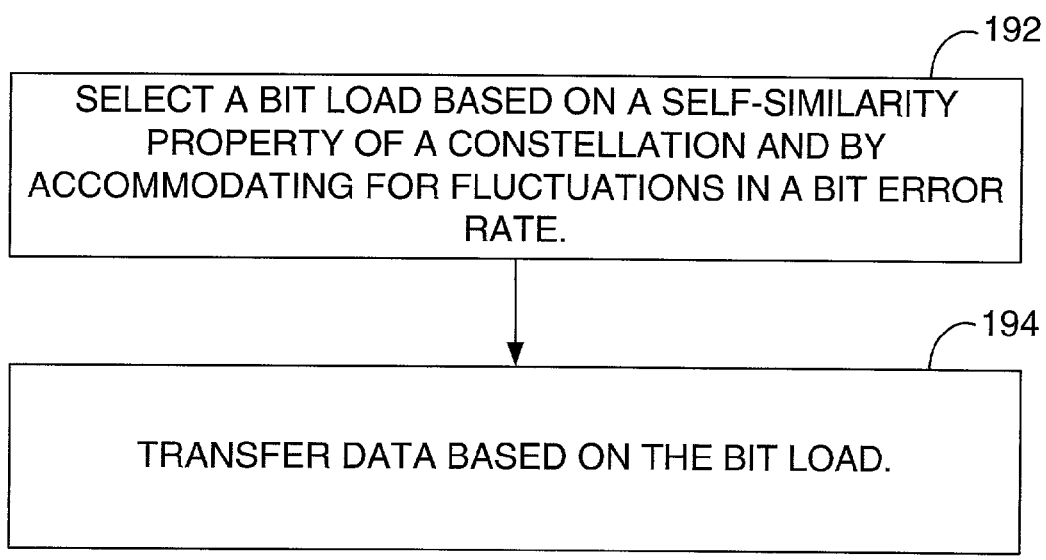
FIG. 11 is a general flowchart of an alternate embodiment of a modem initialization module which determines a bit load based on the self-similarity property of a constellation and also accommodates for fluctuations in the number of bit errors per QAM symbol in accordance with the present invention.

In FIG. 11, a flowchart depicts an alternate embodiment of the invention that adjusts the target bit error rate to accommodate for fluctuations in the bit error rate. In step 192, a bit load is selected based on a self-similarity property of a constellation and by accommodating for fluctuations in the bit error rate. In addition, one or more FEC parameters are also selected. In step 194, data is transferred based on the bit load and FEC parameters. In one embodiment, the modem initialization module 48 (FIG. 2) implements the method of FIG. 11; alternately, the channel initialization module 43 (FIG. 2) implements the method of FIG. 11.

Figure 12:
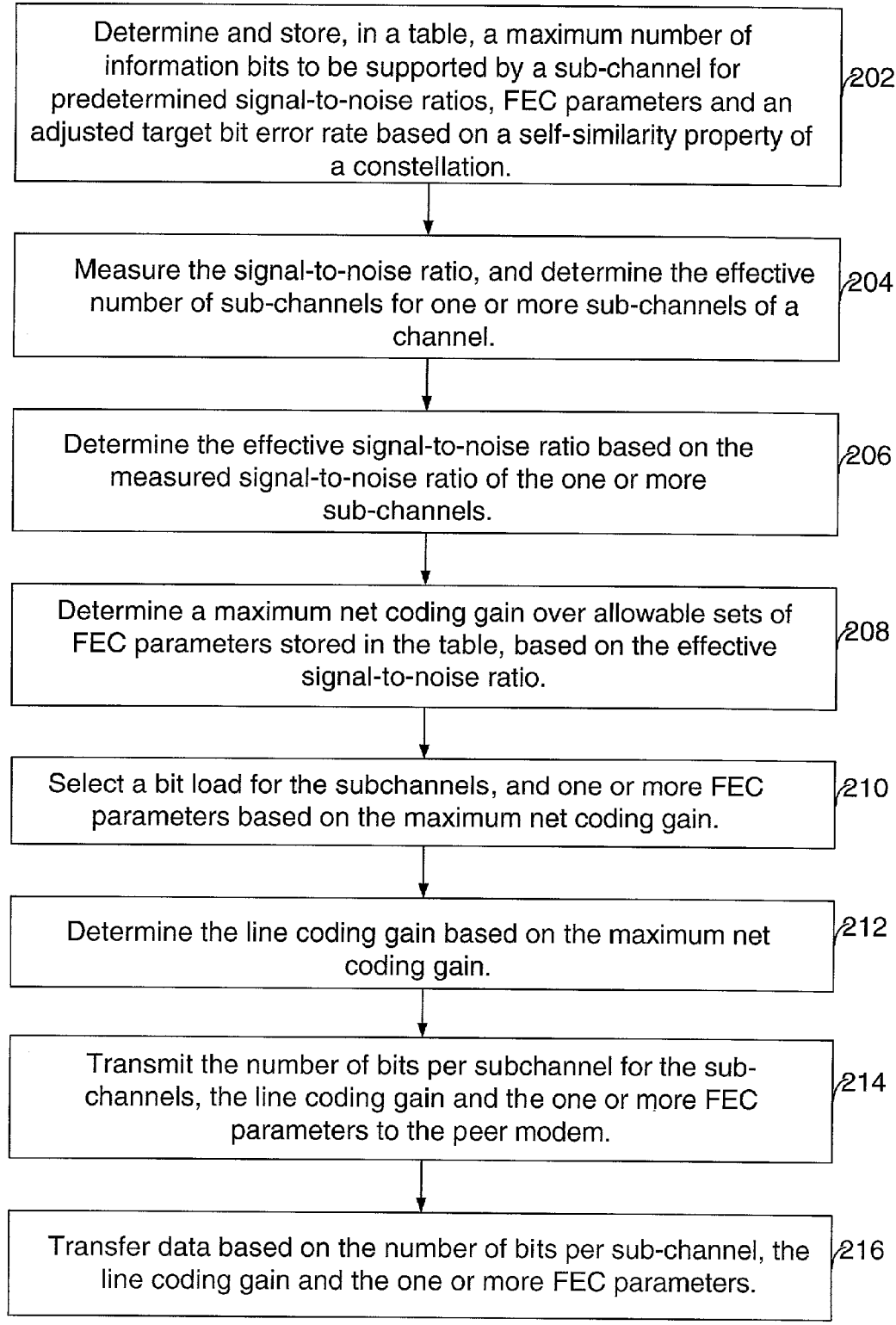
FIG. 12 is a more detailed flowchart of a modem and a channel initialization module which determine a bit load based on the self-similarity property of a constellation and accommodates for fluctuations in a number of bit errors per QAM symbol in accordance with an embodiment of the present invention.

FIG. 12 depicts a more detailed flowchart of the present invention. Before describing the flowchart of FIG. 12, the relationships for determining the bit load and selecting FEC parameters will be described.

Data transmission between two DMT modems uses a Reed-Solomon (RS) code for FEC in combination with a cyclic redundancy check (CRC) to detect and correct, if possible, errors. Data is transmitted in information frames. Each information frame of length N has an information field of a length of K RS symbols, a CRC field of a length of C symbols, and a redundancy field of a length of R symbols. The length of the redundancy field R determines a maximum number of symbol errors t that the Reed-Solomon code can correct. An information frame with t or fewer symbol errors will be corrected by FEC. An information frame with more than t symbol errors will pass through FEC with remaining errors. The CRC will then detect those errors and the frame will be retransmitted.

Considering the DMT symbol as a superposition of n QAM waveforms, the size of a DMT symbol in bits $B_{DMT}$ is equal to the sum of the number of bits carried by all useable sub-channels $b_i$ and is determined in accordance with the following relationship:

$$B_{DMT} = \sum_{i=1}^{n} b_i \qquad (9.1)$$

The expression for the QAM symbol error rate, $p_{QAM}$, is determined as follows:

$$p_{QAM}(b_i,\gamma_i) = 1 - [1-(1-2^{-b_i/2})erfc(\sqrt{3 \cdot 10^{\gamma_i 10}/(2^{b_i+1}-2)})]^2 \qquad (9.2)$$

where $\gamma_i$ is the signal-to-noise ratio of the QAM waveform for the $i^{th}$ sub-channel. The uncoded bit error rate $p_b$ is determined in accordance with the following relationship:

$$p_b = p_{QAM}(b_i, \gamma_i)\omega(b_i) = \qquad (9.3)$$
$$\omega(b_i)(1-2^{-b_i/2})erfc\left(\sqrt{3 \cdot 10^{\gamma_i/10}/(2^{b_i+1}-2)}\right)\left[2 - (1-2^{-b_i/2})erfc\left(\sqrt{3 \cdot 10^{\gamma_i/10}/(2^{b_i+1}-2)}\right)\right]$$

To determine the optimum bit load, Equation (9.4) is solved numerically for values of t and K.

$$1 - \left(1 - W(t,K)\varepsilon_S^{\frac{1}{t+1}}\right)^{1/\alpha} = \qquad (9.4)$$
$$\omega(b_i(t,K))(1-2^{-b_i(t,K)/2})erfc\left(\sqrt{3 \cdot 10^{\gamma_i/10}/(2^{-b_i(t,K)+1}-2)}\right) \times \left[2 - (1-2^{-b_i(t,K)/2})erfc\left(\sqrt{3 \cdot 10^{\gamma_i/10}/(2^{-b_i(t,K)+1}-2)}\right)\right]$$

where, $$W(t,K) = \left[\binom{K+C+R-1}{t}\right]^{-1/(t+1)} \qquad (9.5)$$

In one embodiment, the value of $\omega(b_i(t,K))$ is determined in accordance with Equation (5.4) of the present invention. Using Equation (5.4), the average fraction of erroneous bits per erroneous symbol $\omega(b_i(t,K))$ is equal to $\omega(b_i)$.

In another embodiment, in a system with automatic repeat request (ARQ) as well as FEC, the optimum bit load per sub-channel is determined in accordance with the following equation:

$$1 - \left(1 - W(t,K,k_{tr})\varepsilon_S^{\frac{1}{(t+1)k_{tr}}}\right)^{1/\alpha} = \omega(b_i(t,K,k_{tr})) \qquad (9.6)$$
$$(1-2^{-b_i(t,K,k_{tr})/2})erfc\left(\sqrt{3 \cdot 10^{\gamma_i/10}/(2^{-b_i(t,K,k_{tr})+1}-2)}\right) \times \left[2 - (1-2^{-b_i(t,K,k_{tr})/2})erfc\left(\sqrt{3 \cdot 10^{\gamma_i/10}/(2^{-b_i(t,K,k_{tr})+1}-2)}\right)\right]$$

where, $$W(t,K,k_{tr}) = \left[\binom{K+C+R-1}{t}\right]^{\frac{-1}{(t+1)k_{tr}}}\left[\binom{K+C+R}{t+1}\right]^{\frac{k_{tr}-1}{(t+1)k_{tr}}} \qquad (9.7)$$

and $k_{tr}$ is equal to an allowable number of transmissions. Using Equation (5.4), $\omega(b_i(t,K,k_{tr}))$ is equal to $\omega(b_i)$.

The SER level (RS symbol error rate) $\varepsilon_s$ is related to a specified BER level $\varepsilon$ for the data at the output of the receiver after demodulation and applying error control in accordance with the following relationship:

$$\varepsilon_S = 1 - \left(1 - \frac{\varepsilon}{\beta}\right)^{\alpha} \qquad (9.8)$$

where $\alpha$ is the number of bits per RS symbol, and the coefficient $\beta$ accounts for the effect of the descrambler. For a scrambler polynomial with $m_{scr}$ nonzero coefficients, the coefficient $\beta$ is approximately equal to the number of nonzero coefficients $m_{scr}$ ($\beta \sim m_{scr}$). Typically, the number of bits per RS symbol $\alpha$ is equal to eight; the target BER level $\varepsilon$ is equal to $10^{-7}$; and the coefficient $\beta$ is equal to three.

In another embodiment, to accommodate for fluctuations in the bit error rate, the target BER level $\varepsilon$ is modified by applying the mean square deviation using Equation (6.6) in which the target bit error rate $\varepsilon$ is equal to BER' and the adjusted target bit error rate $\varepsilon_{adj}$ is equal to $BER_o$. The adjusted target bit error rate $\varepsilon_{adj}$ is used in Equation 9.8, rather than $\varepsilon$, to determine the value of $\varepsilon_s$. Therefore, when solving Equations (9.4) and (9.6), the symbol error rate $\varepsilon_s$ is modified to accommodate for fluctuations in the bit error rate.

The net coding gain $G_n$ in bits/DMT symbol (the excess information transferred in one DMT symbol due to FEC) is determined in accordance with the following relationship:

$$G_n(t,K) \equiv \frac{K}{K+C+R}B_{DMT}(t,K) - \frac{K}{K+C}B_{DMT}(0,K) \qquad (9.9)$$

Equation (9.9) takes the FEC redundancy into account. The G.992.2 standard calls for the channel data rate to be transferred. Therefore the line coding gain $G_l$, that is, the total increase in the number of bits to be sent, is determined in accordance with the following relationship:

$$G_l(t,K) \equiv B_{DMT}(t,K) - B_{DMT}(0,K) \qquad (9.10)$$

Equations (9.9) and (9.10) are modified when ARQ is applied. In another embodiment, when ARQ is applied, $B_{DMT}(t, K, k_{tr})$ is used rather than $B_{DMT}(t, K)$. The net coding gain of a DMT symbol $G_n(t, K, k_{tr})$, that is, the excess information throughput per DMT symbol due to FEC and ARQ, is determined in accordance with the following relationship:

$$G_n(t,K,k_{tr}) \equiv \frac{K}{K+C+R}\frac{B_{DMT}(t,K,k_{tr})}{v} - \frac{K}{K+C}B_{DMT}(0,K,1) \qquad (9.11)$$

The average number of transmissions v is determined in accordance with the following relationship:

$$v = \left(1 - \frac{K+C+R}{t+1}\varepsilon_s\right) \bigg/ \left[1 - \left(\frac{K+C+R}{t+1}\varepsilon_s\right)^{1/k_{tr}}\right], \quad (9.12)$$

where $k_{tr}$ represents the maximum number of transmissions.

In yet another embodiment, since the procedure described yields fractional values for $b_i$, an additional adjustment is applied. Such adjustment replaces the obtained $b_i$ values by their integer parts $\lfloor b_i \rfloor$. Then a re-distribution of excess in $b_i$ over all sub-channels is performed.

A "mean-field approximation" for the number of bits of a DMT symbol in a channel is applied. The mean-field approximation is in accordance with Equation (9.13) as follows:

$$B_{DMT} = \sum_{i=1}^{n} b(\gamma_i) \approx n_{eff} b(\gamma_{eff}). \quad (9.13)$$

The effective number of sub-channels is represented by $n_{eff}$, the effective signal-to-noise ratio for the channel is represented by $n_{eff}$, and the effective number of bits per sub-channel is represented by $b(\gamma_{eff})$. The mean-field approximation reduces the complexity of the channel performance evaluation. Equations (9.4) and (9.6) perform equally well for the effective signal-to-noise ratio $\gamma_{eff}$ as well as for the individual signal-to-noise ratios $\gamma_i$ of the subchannels. In Equation (9.13), the effective number of sub-channels $n_{eff}$ and the effective signal-to-noise ratio $\gamma_{eff}$ are respectively determined in accordance with the following relationships:

$$n_{eff} = \sum_{\gamma_i > \gamma_*} 1, \text{ and} \quad (9.14)$$

$$\gamma_{eff} = \frac{1}{n_{eff}} \sum_{\gamma_i > \gamma_*} \gamma_i, \quad (9.15)$$

where $\gamma_*$ is the threshold signal-to-noise ratio below which no information is passed through the channel. Therefore, if the signal-to-noise ratio of a sub-channel does not exceed a predetermined threshold value $\gamma_*$ for the channel, that sub-channel is not used.

Referring to FIG. 12, a more detailed flowchart depicts the determination of the bit load and FEC parameters using the present invention and approximations (9.13)-(9.15). In one embodiment, step 202 of the flowchart of FIG. 12 is implemented in the modem initialization module 48 of the modem driver 40 (FIG. 2); and steps 204-216 are implemented in the channel initialization module 43 (FIG. 2). In step 202, one or more tables having a number of information bits to be supported by a sub-channel based on a self-similarity property of a constellation is generated for allowable sets of FEC parameters, and predetermined signal-to-noise ratios using the adjusted target bit error rate described above to accommodate for fluctuations in the bit error rate. In an alternate embodiment, the target bit error rate is used without adjustment. For each predetermined signal-to-noise ratio value $\gamma$, Equation (9.4) is solved at different allowable values of the maximum number of correctable errors t and the size of the information field K, and a number of bits per sub-channel; this solution, combined with Equation (9.13), yields the maximum number of information bits able to be supported by a DMT symbol within the system's constraints.

In particular, when solving Equation (9.4), the average fraction of erroneous bits per erroneous QAM symbol $\omega(b_i)$ is determined using Equation (5.4) which is based on the self-similarity property of the Hamming distances of a constellation. The tables are stored in memory. In an exemplary table shown in Table 2, below, a number of information bits to be supported by a sub-channel of a DMT symbol is shown for a set of parameters.

In the channel initialization module 43 (FIG. 2), in step 204, measurements of the channel signal-to-noise ratio are made at different carrier frequencies associated with each sub-channel; and at the same time, a total number of "working" sub-channels, that is, the effective number of sub-channels $n_{eff}$ (Equation (9.14)) is determined. To measure the signal-to-noise ratio, the modem sends a predetermined signal pattern to its peer modem. In one embodiment, the predetermined signal pattern is a pseudorandom signal having a predefined spectrum.

In step 206, an effective signal-to-noise ratio for the channel is determined based on the measured signal-to-noise ratio and the effective number of sub-channels $n_{eff}$ using Equation (9.15).

In step 208, a maximum net coding gain over allowable sets of FEC parameters is determined. In one embodiment, the tables generated in step 202 are iteratively accessed for each allowable set of FEC parameters based on the value of the effective signal-to-noise ratio to retrieve the associated number of bits per sub-channel.

The net coding gain per sub-channel for each allowable set of FEC parameters is determined in accordance with Equation (9.16) below:

$$g_n(t, K) \equiv \frac{G_n(t, K)}{n_{eff}} = \frac{K}{K+C+R}b(\gamma_{eff}, t, K) - \frac{K}{K+C}b(\gamma_{eff}, 0, K). \quad (9.16)$$

In step 210, one or more FEC parameters are selected based on the maximum net coding gain per sub-channel $g_n$. The selected FEC parameters yield the largest, i.e., the maximum, value of the net coding gain as determined in accordance with Equation (9.16).

In step 212, the corresponding line coding gain $g_l$ is determined based on the forward error correction parameters that provide the maximum net coding gain $g_n$. The line coding gain per sub-channel $g_l$ is determined in accordance with the following relationship:

$$g_l(t, K) \equiv \frac{G_l(t, K)}{n_{eff}} = b(\gamma_{eff}, t, K) - b(\gamma_{eff}, 0, K) \quad (9.17)$$

In step 214, the bit load per sub-channel for the sub-channels, the line coding gain, and the one or more FEC selected parameters are transmitted to the peer modem. In step 216, data is transmitted using the selected bit load, line coding gain and FEC parameter(s).

In Table 2, below, an exemplary table depicts a number of bits per sub-channel b by SNR $\gamma$ in decibels, and the number of correctable symbol errors t when $\epsilon=10^{-7}$, $\beta=3$, $\alpha=8$, $C=0$ and $K=16$ that is stored in memory. The values of the number of bits per sub-channel b are not the results of applying the average fraction of erroneous bits per erroneous symbol of the present invention, but are shown for illustrative purposes.

TABLE 2

Exemplary portion of a table depicting a number of bits per sub-channel by SNR γ in decibels, and the number of correctable symbol errors t when $\epsilon = 10^{-7}, \beta = 3, \alpha = 8, C = 0, K = 16$

| ε, dB | b |
|---|---|
| t = 0 | |
| 10 | 1.023323e+000 |
| 15 | 2.078584e+000 |
| 20 | 3.486503e+000 |
| 25 | 5.066853e+000 |
| 30 | 6.711104e+000 |
| 35 | 8.376005e+000 |
| 40 | 1.004683e+001 |
| 45 | 1.171884e+001 |
| 50 | 1.339061e+001 |
| t = 1 | |
| 10 | 1.442432e+000 |
| 15 | 2.674824e+000 |
| 20 | 4.163037e+000 |
| 25 | 5.808428e+000 |
| 30 | 7.473964e+000 |
| 35 | 9.151482e+000 |
| 40 | 1.083170e+001 |
| 45 | 1.251171e+001 |
| 50 | 1.419067e+001 |
| t = 2 | |
| 10 | 1.700372e+000 |
| 15 | 3.014947e+000 |
| 20 | 4.566292e+000 |
| 25 | 6.212193e+000 |
| 30 | 7.889203e+000 |
| 35 | 9.574868e+000 |
| 40 | 1.126188e+001 |
| 45 | 1.294799e+001 |
| 50 | 1.463259e+001 |

Figure 13:
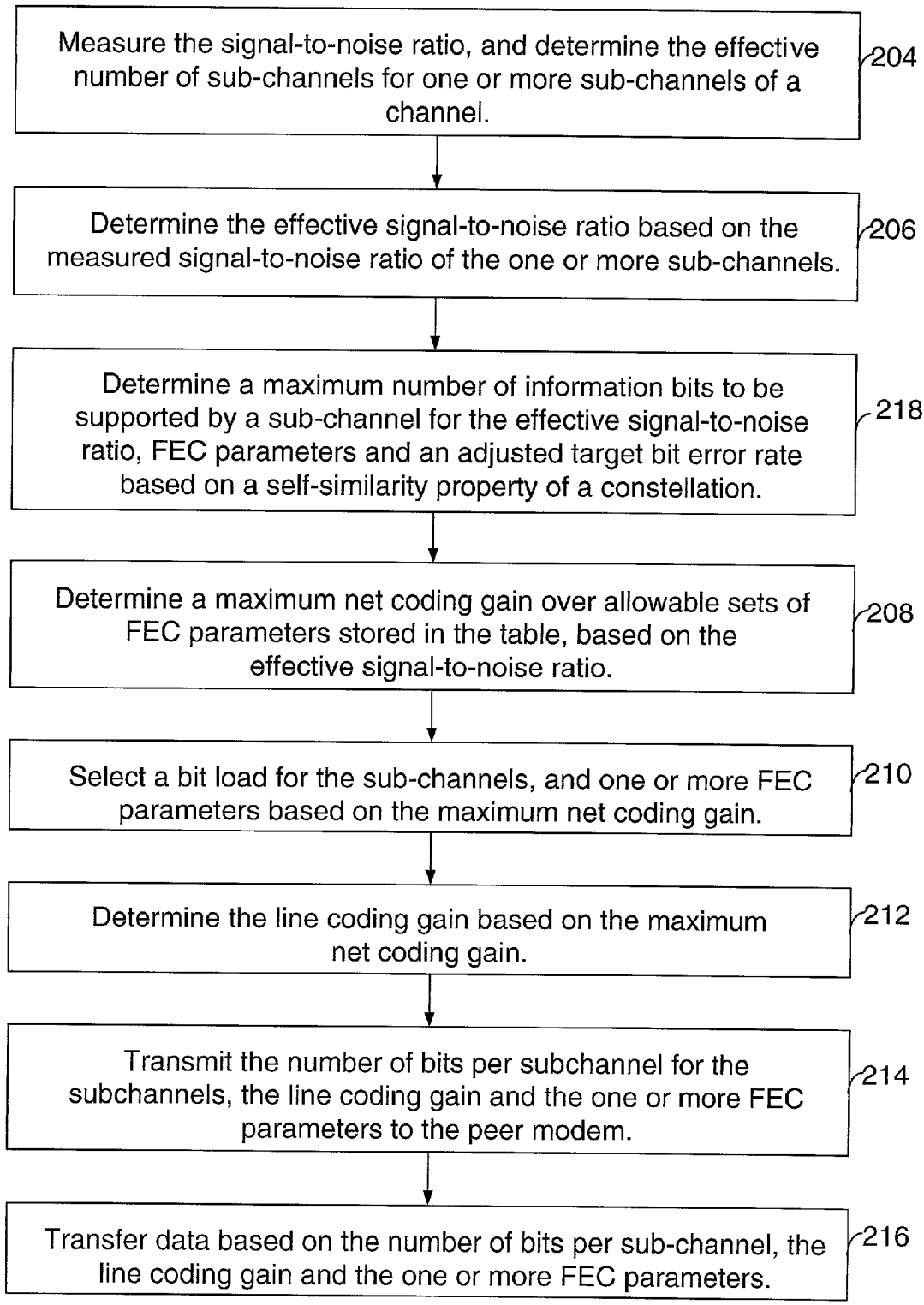
FIG. 13 is a more detailed flowchart of a channel initialization module which determines a bit load based on the self-similarity property of a constellation and accommodates for fluctuations in a number of bit errors per QAM symbol in accordance with an alternate embodiment of the present invention.

FIG. 13 depicts an alternate embodiment of the channel initialization module 43 (FIG. 2). In this embodiment, the channel initialization module generates the bit load information, rather than the modem initialization module. Steps 204, 206, 208-216 are the same as in FIG. 12 and will not be described. After performing step 206, step 218 determines a maximum number of information bits to be supported by a sub-channel for the effective signal-to-noise ratio, allowable FEC parameters and an adjusted target bit error rate based on a self-similarity property of a constellation. In an alternate embodiment, the target bit error rate is not adjusted. The bit load information is stored in memory in one or more tables similar to Table 2.

In another alternate aspect of the invention, these results can be applied to the optimization of DSL systems compliant with the G.992.2 (G.lite), and alternately the G.992.1 (G.dmt), standard.

Although the present invention has been described with respect to a DMT communication system with multiple sub-channels, the present invention can also be used in a communication system having a single QAM channel.

Although various embodiments, each of which incorporates the teachings of the present invention, have been shown and described in detail herein, those skilled in the art can readily devise many other embodiments that still utilize these teachings.

What is claimed is:

1. A method of selecting a bit load b per sub-channel in a multicarrier system, the multicarrier system encoding data based on a constellation of points, each point representing a tuple of data, the constellation having a self-similarity property, comprising:
   determining a probability of having k bit errors in an erroneous tuple (p(k,b)) based on Hamming distances between the points of the constellation;
   estimating an average number of bit errors in an erroneous tuple based on said probability (p(k,b)); and
   selecting the bit load per sub-channel based on the estimated number of bit errors in an erroneous tuple.

2. The method of claim 1 wherein said average number of bit errors in the erroneous tuple is determined as follows:

$$\omega(b) = \frac{12 \cdot 2^b - (3b+2)2^{b/2} - 2b - 4}{6b \cdot 2^b}.$$

3. The method of claim 1 wherein said probability (p(k,b)) is determined as follows:

$$p(k,b) = \frac{1}{2^k}\left[1 + \frac{2}{3 \cdot 2^{b/2}}\right] + \frac{1}{2^k}\frac{2}{3}\left[\frac{1}{2^{b/2}} + \frac{2}{2^b}\right]\delta_{lk}, 1 \le k \le b/2,$$

$$\delta_{ij} = \begin{cases} 1, & \text{where } i = j \\ 0, & \text{where } i \ne j \end{cases}.$$

4. The method of claim 1 wherein said probability (p(k,b)) is determined as follows:

$$p(k,b) = \frac{1}{2^k}\left[1 + O\left(\frac{1}{2^{b/2}}\right)\right], 1 \le k \le b/2.$$

5. The method of claim 1 wherein said probability (p(k,b)) approaches $\frac{1}{2^k}$ for constellations which have large values of b.

6. The method of claim 1 wherein said constellation is square.

7. The method of claim 1 wherein said constellation is non-square.

8. The method of claim 1 wherein the sub-channel has a bit error rate, and further comprising:
   determining a mean square deviation of the number of bit errors in an erroneous tuple;
   wherein said selecting further comprises selecting the bit load per sub-channel based on said mean square deviation of the number of bit errors in an erroneous tuple.

9. The method of claim 8 wherein said mean square deviation of the number of bit errors in an erroneous tuple $\sigma_e$ is determined based on the following relationship:

$$\sigma_s^2 = 2 - \frac{3b^2 + 24b + 20}{12 \cdot 2^{b/2}} + \frac{(6b+4)2^{b/2} - b^2 - 4}{6 \cdot 2^b} + \left(\frac{(3b+2)2^{b/2} + 4}{3 \cdot 2^b}\right)^2.$$

10. The method of claim 8 wherein at large values of b, the mean square deviation of the number of bit errors in an erroneous tuple $\sigma_e$ tends to the square root of two.

11. The method of claim 8 further comprising:
   accessing a table of associated values of the number of bits b and the values of the mean square deviation of the number of bit errors in an erroneous tuple to retrieve a value of a particular mean square deviation of the number of bits errors in an erroneous tuple for a particular value of b; and
   adjusting a target bit error rate to accommodate said value of said particular mean square deviation of the number of bit errors in an erroneous tuple to provide an adjusted target bit error rate, wherein said bit load is also selected based on said adjusted target bit error rate.

12. The method of claim 11 further comprising:
selecting at least one forward error correction parameter based on said adjusted target bit error rate.

13. The method of claim 1 wherein said selecting comprises:
determining a probability of having k bit errors in an erroneously decoded tuple as follows:

$$p(k, b_1, \ldots, b_j) = \sum_{j=1}^{J} \frac{2^{b_l}}{2^b} p(k|\text{symbol transmitted} \in \Omega_j \ \& \ \text{symbol received} \in \Omega_j) +$$

$$\sum_{\substack{j,m \\ m \neq j}}^{J} \left[ \begin{array}{l} p(\text{symbol transmitted} \in \Omega_j \ \& \ \text{symbol received} \in \Omega_m) \times \\ p(k|\text{symbol transmitted} \in \Omega_j \ \& \ \text{symbol received} \in \Omega_m) \end{array} \right]$$

where $2^{b_j}$ is the number of constellation points in each of J adjacent square sub-constellations $\Omega_j$ forming a non-square constellation, and sub-constellation $\Omega_j$ is different from sub-constellation $\Omega_m$; and $$\sum_{j=1}^{J} \frac{2^{b_i}}{2^b} = 1.$$

14. The method of claim 1 wherein said constellation is non-square, and said probability of having k bit errors in an erroneously decoded tuple of the non-square constellation is estimated as if said non-square constellation was a square constellation.

15. The method of claim 1 wherein said constellation is non-square, and said probability of error of said non-square constellation becomes asymptotically close to the probability of error of a square constellation encoder.

16. A method of selecting a bit load b for a channel in a communications system, the communications system encoding data based on a non-square constellation of points, the non-square constellation having a self-similarity property, comprising:
determining a probability of having k bit errors in an erroneously decoded tuple (p(k,b)) based on the self-similarity property of the non-square constellation, wherein said probability of having k bit errors in an erroneously decoded tuple of the non-square constellation is estimated as if said non-square constellation was a square constellation;
selecting the bit load for the channel using said probability.

17. The method of claim 16 wherein the channel has a bit error rate, and further comprising
determining a mean square deviation of the number of bit errors in an erroneous tuple;
wherein said selecting further comprises selecting the bit load based on said mean square deviation of the number of bit errors in an erroneous tuple.

18. The method of claim 16 wherein said self-similarity property is determined with respect to a Hamming distance between the points of the constellation.

19. An apparatus for selecting a bit load b for a channel in a communications system, the communications system encoding data based on a non-square constellation of points, the non-square constellation having a self-similarity property, comprising:
means for selecting the bit load for the channel using an improved estimate of bit error per symbol error based on the self-similarity property of the constellation, wherein said means for selecting comprises means for determining a probability of having k bit errors in an erroneously decoded tuple (p(k,b)) based on Hamming distances between the points of the non-square constellation, and wherein said probability of having k bit errors in an erroneously decoded tuple of the non-square constellation is estimated as if said non-square constellation was a square constellation.

20. The apparatus of claim 19 wherein the channel has a bit error rate, and said means for selecting further comprises means for determining a mean square deviation of the number of bit errors in an erroneous tuple, wherein said means for selecting selects the bit load based on said mean square deviation of the number of bit errors in an erroneous tuple.

21. An apparatus for selecting a bit load b per sub-channel in a multicarrier system, the multicarrier system encoding data based on a constellation of points, each point representing a tuple of data, the constellation having a self-similarity property, comprising:
means for determining a bit load per sub-channel using an estimate of bit error per symbol error and forward error correction parameters, comprising means for determining a probability of having k bit errors in an erroneous tuple (p(k,b)) based on Hamming distances between the points of the constellation, and means for estimating an average number of bit errors in an erroneous tuple based on said probability (p(k,b)); and
means for selecting a bit load based on coding gain and the average number of bit errors in the erroneous tuple.

22. The apparatus of claim 21 wherein said probability (p(k,b)) is determined as follows:

$$p(k, b) = \frac{1}{2^k}\left[1 + \frac{2}{3 \cdot 2^{b/2}}\right] + \frac{1}{2^k}\frac{2}{3}\left[\frac{1}{2^{b/2}} + \frac{2}{2^b}\right]\delta_{lk}, \ 1 \leq k \leq b/2,$$

$$\delta_{ij} = \begin{cases} 1, & \text{where } i = j \\ 0, & \text{where } i \neq j \end{cases}.$$

23. The apparatus of claim 21 wherein said probability (p(k,b)) is determined as follows:

$$p(k, b) = \frac{1}{2^k}\left[1 + O\left(\frac{1}{2^{b/2}}\right)\right], \ 1 \leq k \leq b/2.$$

24. The apparatus of claim 21 wherein said probability (p(k,b)) approaches $\frac{1}{2^k}$ for constellations which have large values of b.

25. The apparatus of claim 21 wherein said constellation is square.

26. The apparatus of claim 21 wherein said constellation is non-square.

27. The apparatus of claim 21 wherein the sub-channel has a bit error rate, and said means for determining the bit load further comprises:
means for determining a mean square deviation of the number of bit errors in an erroneous tuple;
wherein said means for selecting also selects the bit load per sub-channel based on said mean square deviation of the number of bit errors in an erroneous tuple.

28. The apparatus of claim 27 wherein said means for determining the mean square deviation of the number of bit errors in an erroneous tuple determines said mean square deviation of the number of bit errors in an erroneous tuple $\sigma_e$ in accordance with the following relationship:

$$\sigma_s^2 = 2 - \frac{3b^2 + 24b + 20}{12 \cdot 2^{b/2}} + \frac{(6b+4)2^{b/2} - b^2 - 4}{6 \cdot 2^b} + \left(\frac{(3b+2)2^{b/2} + 4}{3 \cdot 2^b}\right)^2.$$

29. The apparatus of claim 28 wherein at large values of b, $\sigma_e$ tends to the square root of two.

30. The apparatus of claim 27 further comprising:
   means for accessing a table of associated values of the number of bits b and the values of the mean square deviation of the number of bit errors in an erroneous tuple to retrieve a value of a particular mean square deviation of the number of bit errors in an erroneous tuple for a particular value of b; and
   means for adjusting a target bit error rate to accommodate said value of said particular mean square deviation of the number of bit error in an erroneous tuple to provide an adjusted target bit error rate, wherein said means for selecting also selects said bit load based on said adjusted target bit error rate.

31. The apparatus of claim 30 wherein said means for selecting selects at least one forward error correction parameter based on said adjusted target bit error rate.

32. The apparatus of claim 21 wherein said means for determining a bit load comprises:
   means for determining a probability of having k bit errors in an erroneously decoded tuple in accordance with the following relationship:

$$p(k, b_1, \ldots, b_j) = $$

$$\sum_{j=1}^{J} \frac{2^{b_j}}{2^b} p(k|\text{symbol transmitted} \in \Omega_j \text{ \& symbol received} \in \Omega_j) +$$

$$\sum_{\substack{j,m \\ m \neq j}}^{J} \left[ \begin{array}{l} p(\text{symbol transmitted} \in \Omega_j \text{ \& symbol received} \in \Omega_m) \times \\ p(k|\text{symbol transmitted} \in \Omega_j \text{ \& symbol received} \in \Omega_m) \end{array} \right]$$

where $2^{b_j}$ is the number of constellation points in each of J adjacent square sub-constellations $\Omega_j$ forming a non-square constellation, and sub-constellation $\Omega_j$ is different from sub-constellation $\Omega_m$; and $$\sum_{j=1}^{J} \frac{2^{b_i}}{2^b} = 1.$$

33. The apparatus of claim 21 wherein said constellation is non-square, and said probability of having k bit errors in an erroneously decoded tuple of the non-square constellation is estimated as if said non-square constellation was a square constellation.

34. The apparatus of claim 21 wherein said constellation is non-square, and said probability of error of said non-square constellation becomes asymptotically close to the probability of error of a square constellation encoder.

35. The apparatus of claim 21 wherein said self-similarity property is determined with respect to a Hamming distance between the points of the constellation.

* * * * *